United States Patent
Koizumi et al.

(10) Patent No.: US 9,945,160 B2
(45) Date of Patent: Apr. 17, 2018

(54) VEHICLE DOOR LOCKING SYSTEM

(71) Applicant: AISIN SEIKI KABUSHIKI KAISHA, Kariya-shi (JP)

(72) Inventors: Takaaki Koizumi, Obu (JP); Takehiro Tabata, Kariya (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 42 days.

(21) Appl. No.: 15/297,667

(22) Filed: Oct. 19, 2016

(65) Prior Publication Data

US 2017/0152687 A1  Jun. 1, 2017

(30) Foreign Application Priority Data

Nov. 27, 2015  (JP) ................... 2015-231958

(51) Int. Cl.
| | |
|---|---|
| *G05B 19/00* | (2006.01) |
| *B60R 25/31* | (2013.01) |
| *E05B 81/62* | (2014.01) |
| *E05B 81/78* | (2014.01) |

(52) U.S. Cl.
CPC .............. *E05B 81/77* (2013.01); *B60R 25/31* (2013.01); *E05B 81/62* (2013.01); *E05B 81/78* (2013.01); *G07C 2209/64* (2013.01)

(58) Field of Classification Search
CPC ......... B60R 25/31; E05B 81/62; E05B 81/77; E05B 81/78; G07C 2209/64
See application file for complete search history.

(56) References Cited

U.S. PATENT DOCUMENTS

| | | |
|---|---|---|
| 2005/0068712 A1 | 3/2005 | Schulz et al. |
| 2006/0012462 A1 | 1/2006 | Teshima et al. |
| 2012/0217764 A1 | 8/2012 | Ishiguro et al. |

FOREIGN PATENT DOCUMENTS

| | | |
|---|---|---|
| EP | 1 505 734 A2 | 2/2005 |
| EP | 2 500 218 A1 | 9/2012 |
| EP | 2 835 287 A1 | 2/2015 |
| FR | 2 931 982 A1 | 12/2009 |
| JP | 2006-28838 | 2/2006 |
| JP | 2012-154118 | 8/2012 |
| JP | 2015-86634 | 5/2015 |

OTHER PUBLICATIONS

Extended European Search Report dated Apr. 21, 2017 in Patent Application No. 16199433.0.

*Primary Examiner* — Omeed Alizada
(74) *Attorney, Agent, or Firm* — Oblon, McClelland, Maier & Neustadt, L.L.P.

(57) ABSTRACT

A vehicle door locking system includes: a sensor device that is mounted in a door handle or a vehicle door of a vehicle, detects presence or absence of an object approaching or being in contact with the sensor device, and outputs a signal for locking or unlocking the vehicle door; and a sensor controller that controls the sensor device, wherein the sensor controller changes a control state of the sensor device or changes a processing state of the signal output from the sensor device on the basis of new information which includes at least one of information output from the sensor device and information output from a device other than the sensor device.

10 Claims, 14 Drawing Sheets

VEHICLE DOOR LOCKING SYSTEM

CROSS REFERENCE TO RELATED APPLICATIONS

This application is based on and claims priority under 35 U.S.C. § 119 to Japanese Patent Application 2015-231958, filed on Nov. 27, 2015, the entire contents of which are incorporated herein by reference.

TECHNICAL FIELD

This disclosure relates to a vehicle door locking system which controls locking and unlocking of a vehicle door.

BACKGROUND DISCUSSION

A vehicle door locking system is known in which a locked and unlocked state of a vehicle door can be changed with a touch on a door handle (for example, see JP 2012-154118A (Reference 1)).

In the vehicle door locking system described in Reference 1, a sensor for detecting a human hand is built into a door handle.

Incidentally, the sensor is operated under predetermined regulation control. According to the regulation control, the operation of the sensor becomes suitable when assumed conditions are satisfied. On the other hand, when the assumed conditions are not satisfied, the operation may become wasteful or may become excessive or insufficient with respect to the actual situation. For example, if the sensor is operated with a high responsivity at all times, power consumption becomes wasteful

SUMMARY

Thus, a need exists for a vehicle door locking system which is not suspectable to the drawback mentioned above.

A vehicle door locking system according to an aspect of this disclosure includes a sensor device that is mounted in a door handle or a vehicle door of a vehicle, detects presence or absence of an object approaching or being in contact with the sensor device, and outputs a signal for locking or unlocking the vehicle door, and a sensor controller that controls the sensor device, in which the sensor controller changes a control state of the sensor device or changes a processing state of the signal output from the sensor device on the basis of new information which includes at least one of information output from the sensor device and information output from a device other than the sensor device. The new information indicates information obtained in real time or in sequence.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
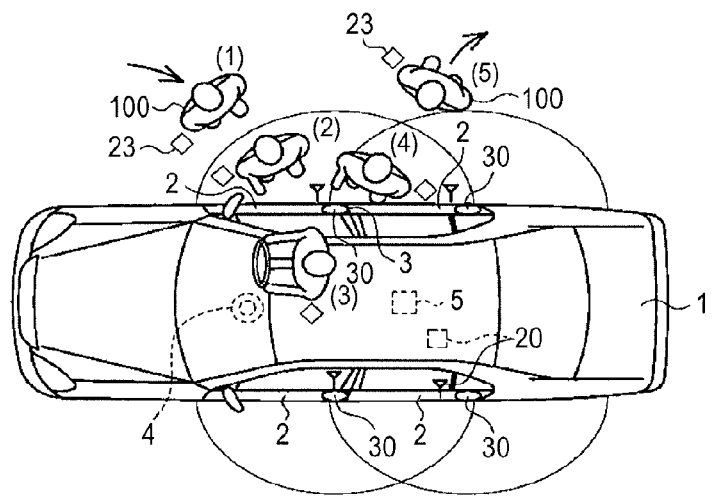
FIG. 1 is a schematic view of a vehicle door locking system.

With reference to FIG. 1, a vehicle door locking system will be described.

First, as an example of a vehicle door locking system 10, a vehicle door locking system having a communication function will be described. The vehicle door locking system 10 includes a communication device 20 that communicates with a portable device 23, and a sensor device 30 that detects an object approaching or being in contact with an outside door handle (hereinafter, "door handle 3"). "An object approaching or being in contact with an outside door handle" also means an object approaching the sensor device 30 (an object in an approaching operation), and an object having approached the sensor device 30 (an object after an approaching operation, an object being stopped and separated from the sensor device 30, or an object in the vicinity of the sensor device 30 not being stopped). The object includes human hands, physical objects such as clothes and a bag, and fluids such as water.

The sensor device 30 is disposed in a door handle 3 or in a vehicle door 2. A detection area of the sensor device 30 is narrower than a detection area of the communication device 20 (for example, within an area having a radius of several centimeters or several tens of centimeters). The detection area of the communication device 20 is the vicinity of the vehicle door 2 (for example, within an area having a radius of several centimeters).

The communication device 20 communicates with the portable device 23 using a radio wave or light. The portable device 23 is carried by a user. The communication device 20 transmits a request signal with a predetermined period (refer to Xms in FIG. 8). The portable device 23 transmits a response signal when receiving the request signal. When the communication device 20 receives the response signal, the communication device 20 matches unique information transmitted by the portable device 23 (hereinafter, "ID information") with registered information (information registered in the communication device 20). When the unique information and the registered information match (when the unique information and the registered information satisfy matching conditions), the communication device 20 transmits a signal for achieving a state in which the vehicle door 2 can be locked or unlocked (user-recognized state) to a control device 40. That is, the communication device 20 causes the vehicle door 2 to enter the user-recognized state when the portable device 23 is detected. The user-recognized state and a user-unrecognized state of the vehicle door 2 are not physically different states but are information set on the basis of detection of the portable device 23.

The sensor device 30 detects an object approaching or being in contact with the sensor device 30 (specifically, human hands). When the sensor device 30 detects the object, the sensor device 30 outputs a signal (hereinafter, "locking operation signal") for operating a locking operation device (a device that controls locking and unlocking of the vehicle door 2) in the vehicle door 2 to the control device 40. That is, when the vehicle door 2 is in the user-recognized state and the control device 40 receives the locking operation signal output from the sensor device 30, the control device 40 operates the locking operation device.

With reference to FIG. 1, an operation of the vehicle door locking system 10 will be described. In a vehicle 1 in FIG. 1, the sensor device 30 and the communication device 20 are built into the vehicle door 2. The control device 40 is built into the vehicle 1. In FIG. 1, an arc line in the vicinity of the vehicle door 2 shows the detection area of the communication device 20. A person 100 carries the portable device 23. FIG. 1 illustrates the person 100 getting in the vehicle 1 (<1> to <3> in FIG. 1) and the person 100 getting out of the vehicle 1 (<3> to <5> in FIG. 1).

When the person 100 is on the outside of the detection area as illustrated by <1> in FIG. 1, the communication device 20 does not receive the response signal from the portable device 23, and thus the vehicle door 2 is in the user-unrecognized state.

When the person 100 enters the detection area as illustrated by <2> in FIG. 1, the communication device 20 receives the response signal from the portable device 23 and performs communication for the matching. When the unique information and the registered information match (when the matching conditions are satisfied), the vehicle door 2 transitions to the user-recognized state. When the person 100 touches the sensor device 30 in the user-recognized state, the control device 40 causes the locking operation device to transition to the unlocked state (a state in which the locking operation device operates to allow opening and closing of the vehicle door 2) on the basis of an output signal from the sensor device 30 to make the vehicle door 2 openable and closeable. Accordingly, the person 100 can get in the vehicle as illustrated by <3> in FIG. 1.

When the person 100 gets out of the vehicle 1 and the person 100 touches the sensor as illustrated by <4> in FIG. 1, the control device 40 causes the locking operation device to transition to the locked state on the basis of the output signal from the sensor device 30. On the other hand, the communication device 20 receives the response signal from the portable device 23 and performs communication for the matching.

When the person 100 moves to the outside of the detection area thereafter as illustrated by <5> in FIG. 1, the communication device 20 does not receive the response signal from the portable device 23, and the vehicle door 2 transitions to the user-unrecognized state.

First Example

Figure 2:
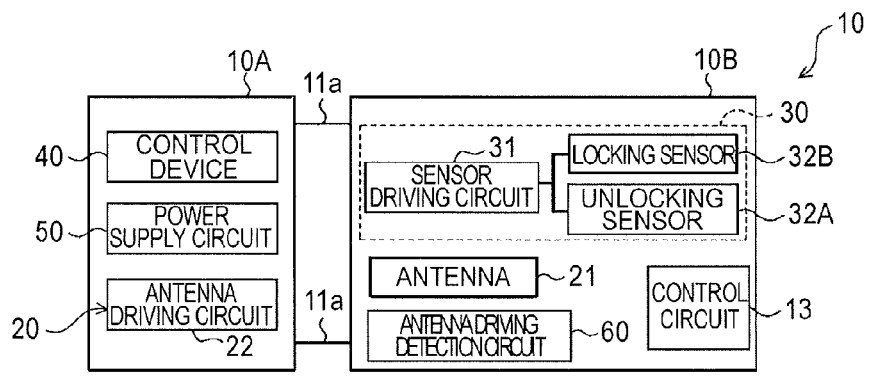
FIG. 2 is a block diagram of a first example of the vehicle door locking system.

With reference to FIG. 2, an example of the configuration of the vehicle door locking system 10 will be described.

In the example illustrated in FIG. 2, the vehicle door locking system 10 includes a power supply circuit 50 and an antenna driving detection circuit 60 in addition to the control device 40, the sensor device 30, and the communication device 20.

In this example, the sensor device 30 is configured as a device that detects approaching of an object or contact with an object using a change in capacitance. Specifically, the sensor device 30 is configured of a capacitance sensor.

The communication device 20 includes an antenna 21 that transmits a radio wave signal and an antenna driving circuit 22 that drives the antenna 21. The power supply circuit 50 supplies electric power to the sensor device 30, the communication device 20, and the antenna driving detection circuit 60. The sensor device 30 includes a sensor driving circuit 31, an unlocking sensor 32A, and a locking sensor 32B. The unlocking sensor 32A and the locking sensor 32B include respective electrodes 37 (refer to FIG. 5).

Figure 3:
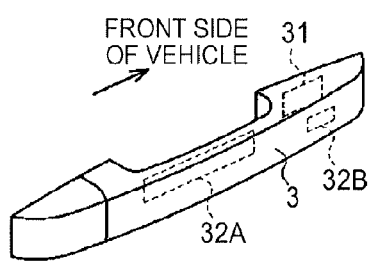
FIG. 3 is a perspective view of a door handle.

As illustrated in FIG. 3, for example, the unlocking sensor 32A is disposed on an inner surface of the door handle 3 (a surface facing the vehicle door 2). The unlocking sensor 32A detects approaching of an object (for example, hands) or contact with an object. When the unlocking sensor 32A detects the object, the unlocking sensor 32A outputs a signal for causing the locking operation device to transition from the locked state to the unlocked state. The locking sensor 32B is disposed on the front side and the outer side of the door handle 3. The locking sensor 32B detects approaching of an object (for example, hands) or contact with an object. When the locking sensor 32B detects the object, the locking sensor 32B outputs a signal for causing the locking operation device to transition from the unlocked state to the locked state.

The antenna 21 is controlled by the antenna driving circuit 22. The antenna driving circuit 22 drives the antenna 21 as follow, for example. When elapsed time from when an ignition switch 4 (IG) switches from ON to OFF (hereinafter, "parking time") exceeds a set parking time (for example, 24 hours) in the vehicle 1, the antenna driving circuit 22 stops the driving of the antenna 21. When the parking time is shorter than the set parking time, the antenna driving circuit 22 drives the antenna 21 with a predetermined period, and transmits the request signal from the antenna 21. When a signal indicating that the portable device 23 is detected is received by the antenna driving circuit 22, the antenna driving circuit 22 sets a driving time of the antenna 21 to be long in order to match the portable device 23 with the communication device 20. That is, the antenna 21 is controlled using two types of driving schemes including short-time driving (driving for transmission of the request signal) and long-time driving (driving for matching), in regard of the driving time.

The antenna driving detection circuit 60 detects the driving of the antenna 21 (transmission state) and outputs a signal indicating a driving state to the sensor driving circuit 31. The driving of the antenna 21 means that the antenna 21 is operated at a predetermined frequency. That is, the antenna driving detection circuit 60 determines that the antenna 21 is in a stoppage state during an inter-driving period of the antenna 21 being driven with the predetermined period.

The control device 40, the antenna driving circuit 22, and the power supply circuit 50 constitute a control unit 10A and are built into the vehicle 1. The sensor device 30, the antenna 21, and the antenna driving detection circuit 60 constitute a sensor unit 10B and are built into the door handle 3. The control unit 10A and the sensor unit 10B are connected via two connection lines 11a.

Figure 4:
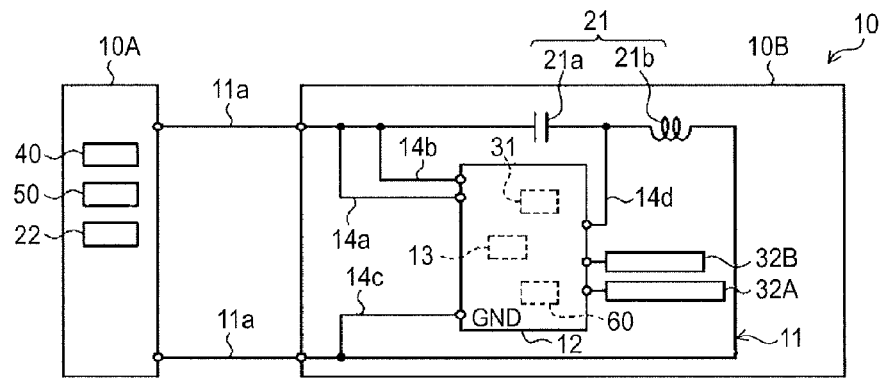
FIG. 4 is a circuit diagram of the first example of the vehicle door locking system.

With reference to FIG. 4, an example of the circuit configuration of the vehicle door locking system 10 will be described.

As illustrated in FIG. 4, the vehicle door locking system 10 is provided with a main wire 11 including two connection lines 11a. The main wire 11 extends from the control unit 10A, passes through the sensor unit 10B, and returns to the control unit 10A. The main wire 11 includes the antenna 21 configured of a capacitor 21a and a coil 21b.

The sensor driving circuit 31 and the antenna driving detection circuit 60 of the sensor device 30 are accommodated in one electronic control unit (hereinafter, "sensor ECU 12"). The sensor ECU 12 includes a control circuit 13 (sensor controller) that controls the sensor driving circuit 31. The control circuit 13 may be built into the antenna driving detection circuit 60 or the sensor driving circuit 31.

The sensor ECU 12 is connected to the unlocking sensor 32A and the locking sensor 32B. Furthermore, the sensor ECU 12 is connected to the main wire 11 via a first wire 14a, a second wire 14b, and a third wire 14c, and is connected to a portion of the antenna 21 between the capacitor 21a and the coil 21b via a fourth wire 14d.

Power supply to the sensor ECU 12 is performed via the first wire 14a.

The antenna driving detection circuit 60 in the sensor ECU 12 detects a potential of a portion of the antenna 21 between the capacitor 21a and the coil 21b via the fourth wire 14d, and determines whether the antenna 21 is driven or not on the basis of a potential change in the portion.

The sensor driving circuit 31 of the sensor ECU 12 executes control for detecting the amount of change in capacitance with respect to the unlocking sensor 32A and the locking sensor 32B. The sensor driving circuit 31 determines whether there is an object approaching or being in contact with the locking sensor 32B on the basis of the amount of change in capacitance of the locking sensor 32B. Furthermore, the sensor driving circuit 31 determines whether there is an object approaching or being in contact with the unlocking sensor 32A on the basis of the amount of change in capacitance of the unlocking sensor 32A. Thereafter, the sensor driving circuit 31 outputs a signal indicating a result of the determination on whether there is an object approaching or being in contact with the sensors 32A and 32B (hereinafter "determination signal") to the control device 40 via the second wire 14b. The sensor driving circuit 31 executes detection of the amount of change in capacitance and output of a detection determination result based on the detection, as a series of operations (which is called "sampling").

The sensor driving circuit 31 controls execution of the sampling on the basis of the driving of the antenna 21. Specifically, the sensor driving circuit 31 stops the sampling when receiving a signal indicating that the antenna 21 is driven. The sensor driving circuit 31 executes the sampling when not receiving the signal indicating that the antenna 21 is driven. That is, the sensor driving circuit 31 executes the sampling and detects the amount of change in capacitance during an inter-driving period of the antenna 21 being subject to intermittent driving (refer to FIG. 8).

An effect of the above-described circuit configuration will be described.

In the above-described circuit configuration, a wire transmitting a signal for antenna driving and a wire transmitting the determination signal output from the sensor driving circuit 31 are the same wire (main wire 11). That is, the above-described circuit configuration has a small number of wires compared to a configuration in which these signals are transmitted via a dedicated wire. Therefore, the configuration of the vehicle door locking system 10 is simple. Furthermore, in a case of such a configuration, in order to suppress interference between the signal for antenna driving and the determination signal output from the sensor driving circuit 31, these signals are output at different timings so as not to overlap with each other (refer to FIG. 8).

Figure 5:
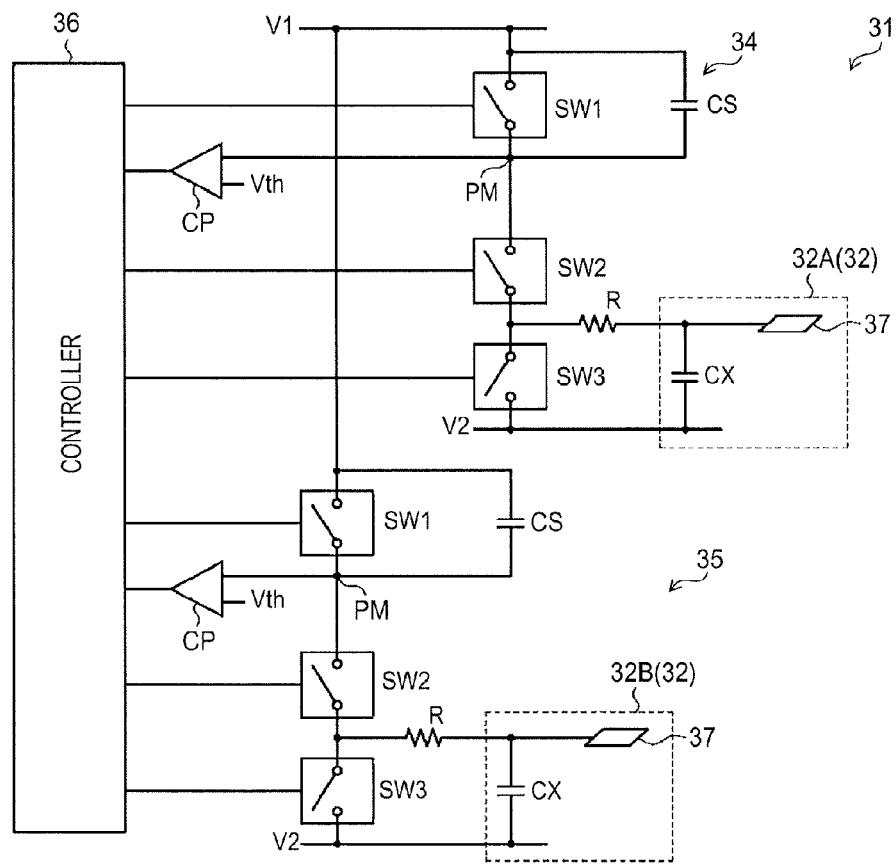
FIG. 5 is a circuit diagram of a sensor driving circuit.

With reference to FIG. 5, an example of the sensor driving circuit 31 will be described.

The sensor driving circuit 31 is connected to the locking sensor 32B and the unlocking sensor 32A.

The locking sensor 32B and the unlocking sensor 32A include respective electrodes 37 and store capacitance. The sensor driving circuit 31 detects the amount of change in capacitance of the locking sensor 32B and the unlocking sensor 32A. The locking sensor 32B and the unlocking sensor 32A change capacitance when there is approaching of an object or contact with an object, and constitute a capacitor CX with variable capacitance. The unlocking sensor 32A and the locking sensor 32B are simply called the sensor 32 when the unlocking sensor 32A and the locking sensor 32B are described not being distinguished.

The sensor driving circuit 31 includes a first circuit section 34 connected to the unlocking sensor 32A, a second circuit section 35 connected to the locking sensor 32B, and a controller 36 that controls the first circuit section 34 and the second circuit section 35. The basic configuration of the first circuit section 34 is the same as the basic configuration of the second circuit section 35. The first circuit section 34 includes a reference capacitor CS, three switches (hereinafter, "first switch SW1", "second switch SW2", and "third switch SW3", respectively) of which operation control is performed by the controller 36, and a potential determination device CP.

The reference capacitor CS is connected to the sensor 32 in series. Specifically, the reference capacitor CS and the sensor 32 are arranged in series between a first potential source and a second potential source. The first potential source has a potential higher than that of the second potential source. The second potential source may be grounded. An end of the reference capacitor CS is connected to the first potential source and the other end of the reference capacitor CS is connected to the second potential source. The electrode 37 of the sensor 32 is connected between the reference capacitor CS and the second potential source. The electrode 37 is capacitive-coupled to the second potential source through a space. The capacitance of the sensor 32 changes depending on whether or not there is an object approaching or being in contact with the electrode 37.

The first switch SW1 is connected to the reference capacitor CS in parallel. The second switch SW2 is connected between the reference capacitor CS and the electrode 37 of the sensor 32. An end of the second switch SW2 is connected to the reference capacitor CS, and the other end of the second switch SW2 is connected to the electrode 37 via a resistor R. Furthermore, the other end of the second switch SW2 is connected to the second potential source via the third switch SW3. The third switch SW3 is connected to the sensor 32 in parallel. An end of the third switch SW3 is connected to the electrode 37 via the resistor R, and the other end of the third switch SW3 is connected to the second potential source.

The potential determination device CP compares a potential (hereinafter, "intermediate potential VM") in a position (hereinafter, "intermediate position PM") between the reference capacitor CS and the sensor 32 (that is, between the reference capacitor CS and the electrode 37) with a set potential Vth to determine whether or not the intermediate potential VM is smaller than the set potential Vth. The potential determination device CP outputs an initial stage signal when the intermediate potential VM is equal to or greater than the set potential Vth, and outputs a termination signal when the intermediate potential VM is smaller than the set potential Vth. The potential determination device CP may be configured of a comparator.

Figure 6:
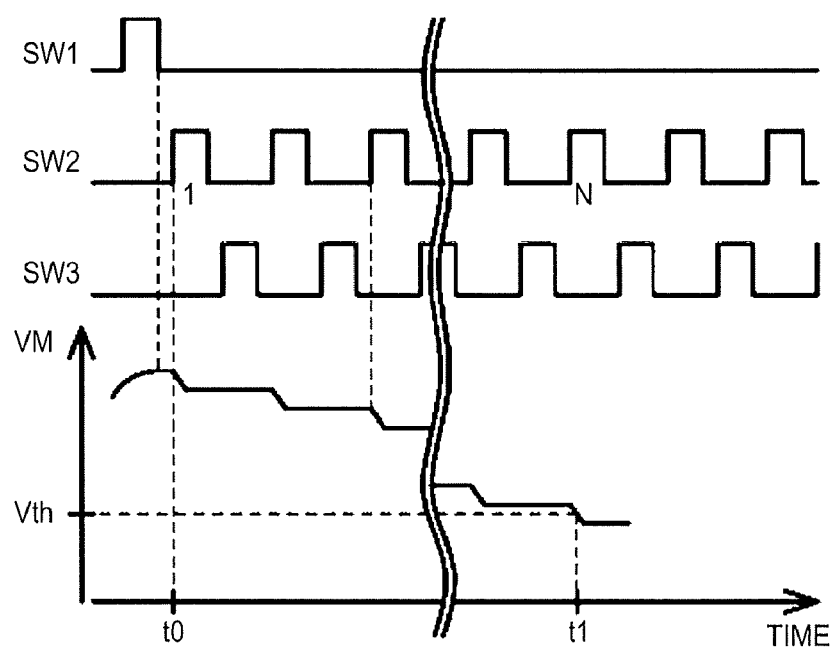
FIG. 6 is a diagram illustrating a relationship between operation timings of a first switch, a second switch, and a third switch and a voltage change graph that shows a change in potential at an intermediate position.

With reference to FIG. 6, switching control for detecting the amount of change in capacity of the sensor 32 (corresponding to the amount of change in capacitance of the sensor 32) will be descried.

The first switch SW1, the second switch SW2, and the third switch SW3 are operated with a predetermined period. In an initial stage of the period, the first switch SW1 is closed, and the second switch SW2 and the third switch SW3 are open. Accordingly, the reference capacitor CS is initialized, and the potential in the intermediate position PM becomes equal to the potential V1 of the first potential source. Hereinafter, the potential in the intermediate position PM when the reference capacitor CS is initialized is referred to as "initial potential" (the initial potential is equal to the potential V1).

Next, the first switch SW1 is open, and the second switch SW2 and the third switch SW3 are open and closed alternately. For this reason, as illustrated in FIG. 6, the intermediate potential VM decreases gradually. When the intermediate potential VM becomes smaller than the set potential Vth, the potential determination device CP outputs the termination signal to the controller 36.

The controller 36 counts the number of switching operations of the second switch SW2 or the third switch SW3 executed in a period of time from an initial stage of a period and to reception of the termination signal, for each period. That is, the controller 36 counts the number of switching operations over a period of time (from a time t0 to a time t1) in which the intermediate potential VM reaches the set potential Vth starting from the initial potential.

Furthermore, the controller 36 calculates a difference in the number of switching operations N between two points in time (hereinafter, difference in the number of switching operations ΔN). The difference in the number of switching operations ΔN is defined as a difference between the number of switching operations N1 obtained before the calculation of the difference in the number of switching operations ΔN and the number of switching operations N2 obtained during the calculation. The difference in the number of switching operations ΔN is a value corresponding to the amount of change in capacitance of the sensor 32. That is, the difference in the number of switching operations ΔN is an index indicating that there is an object approaching or being in contact with the sensor 32.

Next, the controller 36 compares the difference in the number of switching operations ΔN with a set value NUM, and determines whether or not the difference in the number of switching operations ΔN is greater than the set value NUM. The controller 36 determines that there is an object approaching or being in contact with the sensor 32 when the difference in the number of switching operations ΔN is greater than the set value NUM.

Note that, control for detecting the amount of change in capacitance of the sensor 32 using the switching operation of the sensor driving circuit 31 and for determining whether there is an object approaching or being in contact with the sensor 32 on the basis of the amount of change corresponds to the "sampling". Hereinafter, a period of the sampling is referred to as "sampling period".

As described above, the sensor ECU 12 controls a detection operation (that is, sampling) of detecting the amount of change in capacitance on the basis of the driving of the antenna 21. Specifically, the sensor ECU 12 stops the control (sampling) for detecting the amount of change in capacitance when detecting that the antenna 21 is driven. The sensor ECU 12 executes the control (sampling) for detecting the amount of change in capacitance when detecting that the antenna 21 is not driven.

Figure 7:
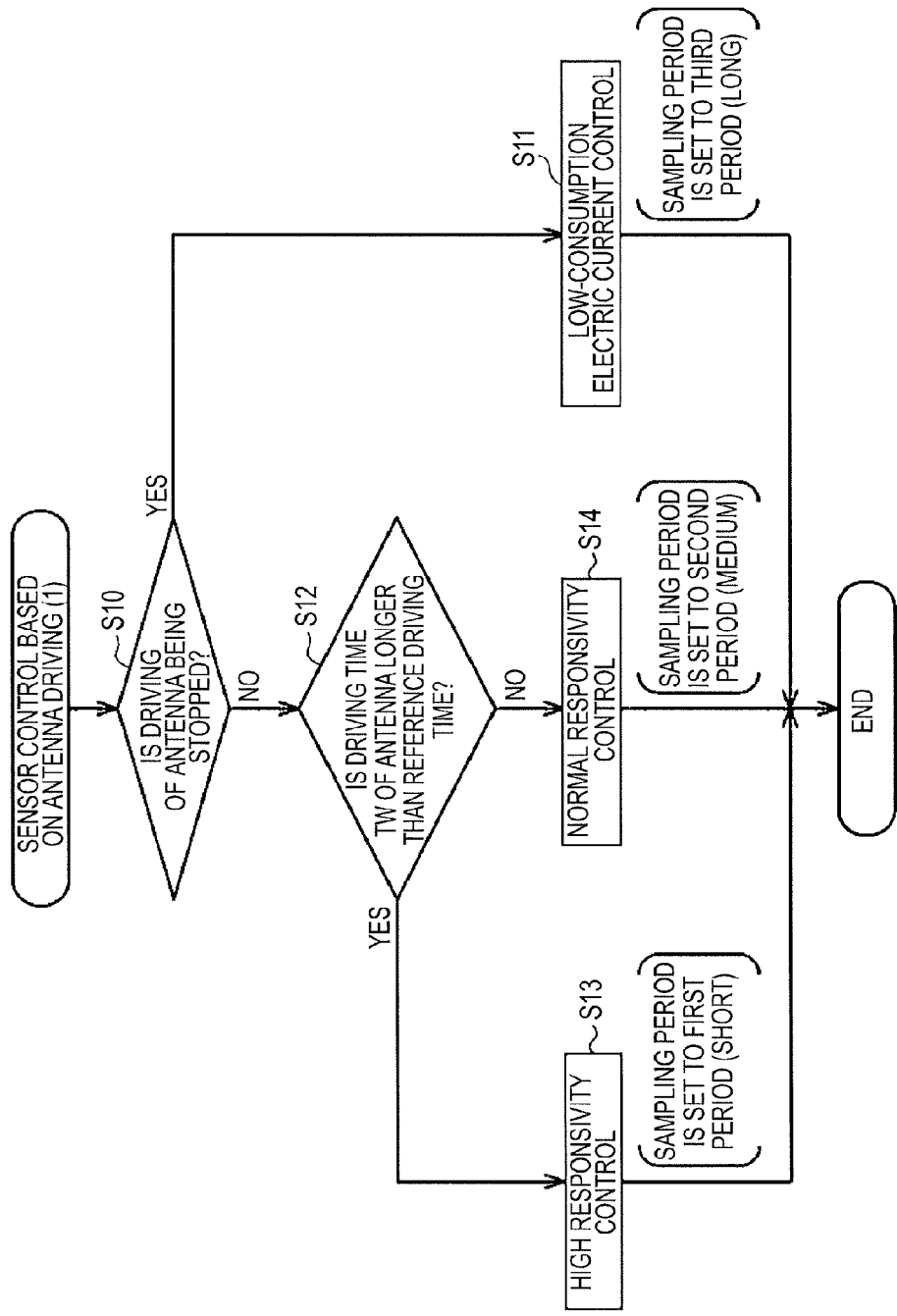
FIG. 7 is a flow chart of "sensor control based on antenna driving (1)"

With reference to FIG. 7, control which the control circuit 13 executes ("sensor control based on antenna driving (1)") will be described.

The control circuit 13 changes a control state of the sampling on the basis of the driving state of the antenna 21 immediately before the change.

In Step S10, the control circuit 13 determines whether a driving stoppage time of the antenna 21 is equal to or longer than a set stoppage time (for example, several minutes) on the basis of a signal output from the antenna driving detection circuit 60. When the driving stoppage time of the antenna 21 is longer than the set stoppage time (YES), the sensor driving circuit 31 is subject to low-consumption electric current control. Specifically, in Step S11, the control circuit 13 controls the sensor driving circuit 31 so that the sensor driving circuit 31 operates with the sampling period being set to a third period (a period longer than a second period described below).

In Step S10, when it is determined that the driving stoppage time of the antenna 21 is shorter than the set stoppage time (NO), that is, when the antenna 21 is subject to the intermittent driving, the control circuit 13 executes a process in Step S12. In Step S12, the control circuit 13 determines whether a driving time TW of the antenna 21 is longer than a reference driving time referring to the driving time TW immediately before the determination (the determination in Step S10). The reference driving time is set to be longer than a driving time of the antenna 21 in the short-time driving and shorter than that in the long-time driving. That is, in Step S12, it is determined whether the driving of the antenna 21 is for transmission of the request signal or is for the matching with respect to the portable device 23. When the driving time TW of the antenna 21 is longer than the reference driving time (that is, when the driving of the antenna 21 is for the matching), the sensor driving circuit 31 is controlled so that the sensor 32 exhibits a high responsivity (high responsivity control). Specifically, in Step S13, the control circuit 13 controls the sensor driving circuit 31 so that the sensor driving circuit 31 operates with the sampling period being set to a first period (a period shorter than the second period described below).

When the determination result in Step S12 is negative (NO), that is, when the driving time TW of the antenna 21 is equal to or shorter than the reference driving time (that is, when the driving of the antenna 21 is for transmission of the request signal), the sensor driving circuit 31 is controlled so that the sensor 32 exhibits a normal responsivity (normal responsivity control). Specifically, in Step S14, the control circuit 13 controls the sensor driving circuit 31 so that the sensor driving circuit 31 operates with the sampling period being set to the second period.

Figure 8:
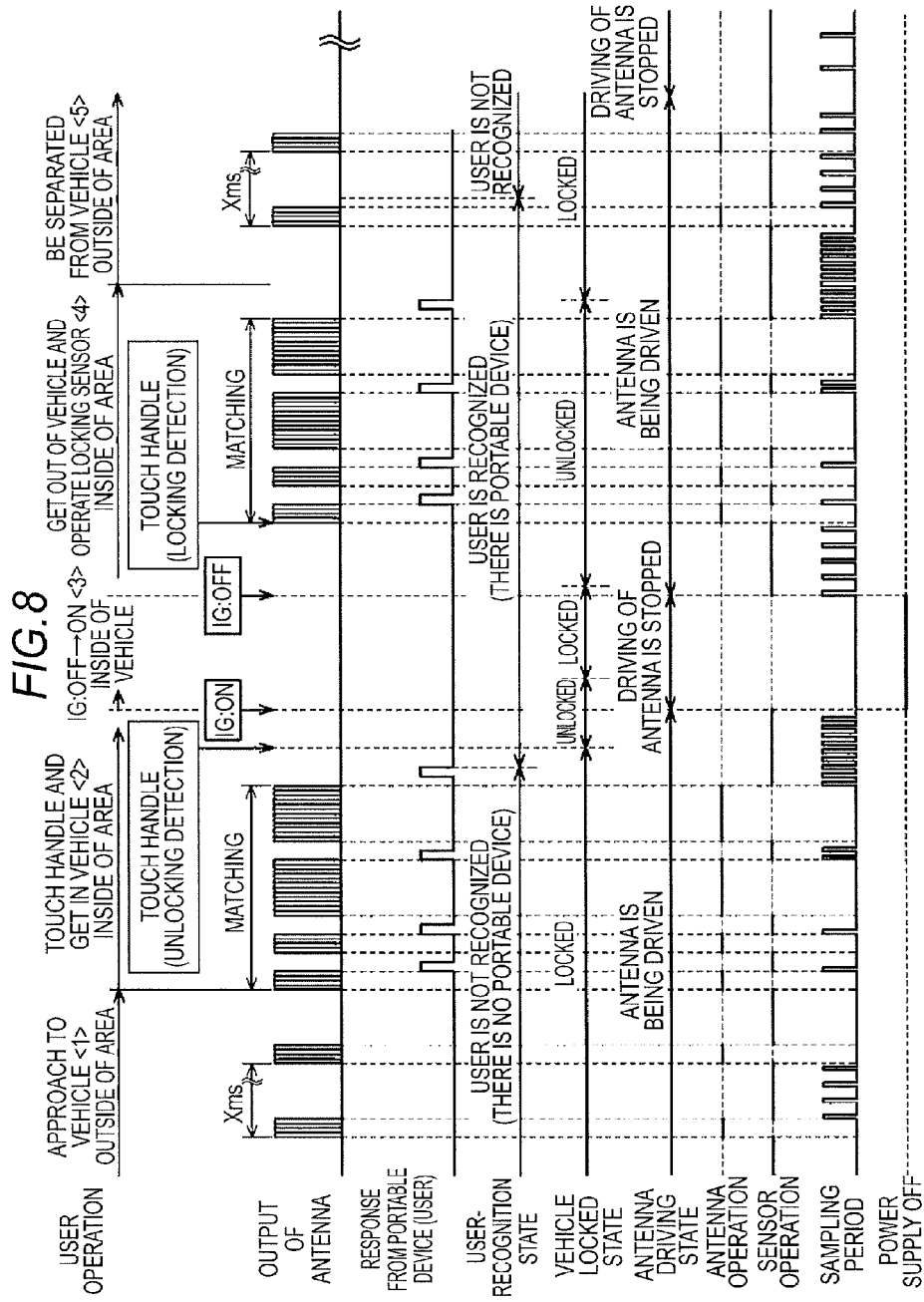
FIG. 8 is a timing chart illustrating timings of various signals in the vehicle door locking system.

With reference to a timing chart in FIG. 8, operations of various devices accompanying boarding and alighting of the person 100 will be described.

<1> When the person 100 approaches the vehicle but still is on the outside of the detection area of the antenna 21, the portable device 23 and the communication device 20 do not communicate with each other. The communication device 20 outputs the request signal from the antenna 21. That is, the antenna 21 is controlled using the short-time driving. In this case, by the control illustrated in FIG. 7, the sampling period is set to the second period so that the sensor 32 (the locking sensor 32B and the unlocking sensor 32A) exhibits a normal responsivity.

<2> When the person 100 enters the detection area of the antenna 21, the portable device 23 and the communication device 20 communicate with each other. The communication device 20 sets the driving time TW of the antenna 21 to be long for the matching with respect to the portable device 23. That is, the antenna 21 is controlled using the long-time driving. In this case, by the control illustrated in FIG. 7, the sampling period of the unlocking sensor 32A is set to the first period so that the unlocking sensor 32A exhibits a high responsivity.

When the matching of the portable device 23 with the communication device 20 is finished, the vehicle door 2 is set to be in the user-recognized state. When the unlocking sensor 32A detects an object during the user-recognized state with a hand approaching or being in contact with the door handle 3 of the vehicle door 2, the locked state of the vehicle door 2 is released. Accordingly, the vehicle 1 enters an able-to-get in state.

<3> When the person 100 gets in the vehicle 1 and the ignition switch 4 (IG) is switched to ON, the driving of the sensor device 30 is stopped. Accordingly, power consumption in the sensor device 30 is suppressed.

<4> When the ignition switch 4 (IG) is switched from ON to OFF, the driving of the sensor device 30 starts. In this case, the sensor 32 operates with a normal responsivity (that is, the second period). When the locked state of the vehicle door 2 is released, the person 100 gets out of the vehicle 1, and a hand comes into contact with the locking sensor 32B of the door handle 3, the sensor device 30 detects the contact. Meanwhile, when the communication between the portable device 23 and the communication device 20 is started, the communication device 20 sets the driving time of the antenna 21 to be long for the matching with respect to the portable device 23. That is, the antenna 21 is controlled using the long-time driving.

<5> When the person 100 moves away from the vehicle door 2 and moves to the outside of the detection area of the antenna 21, the portable device 23 and the communication device 20 do not communicate with each other. Meanwhile, the communication device 20 continues to output the request signal from the antenna 21. That is, the antenna 21 is controlled using the short-time driving. In this case, by the control illustrated in FIG. 7, the sampling period of the sensor 32 is set to the second period so that the sensor 32 (the locking sensor 32B and the unlocking sensor 32A) exhibits a normal responsivity. Thereafter, when the parking time of the vehicle 1 exceeds the set parking time, the driving of the antenna 21 is stopped. When the driving stoppage time of the antenna 21 exceeds the set stoppage time, by the control illustrated in FIG. 7, the sampling period of the sensor 32 is set to the third period. Accordingly, power consumption in the sensor 32 is suppressed.

Next, an operation of the vehicle door locking system 10 according to the first example will be described.

The driving time TW of the antenna 21 is long when the matching with respect to the portable device 23 is performed as compared to when the request signal is output. When the communication device 20 performs the matching with respect to the portable device 23 is when a person approaches the vehicle door 2 (that is, when the person is about to get in the vehicle), and a human hand is likely to approach or be in contact with the door handle 3 at that time. Meanwhile, when the antenna 21 transmits the request signal is when there is no person in the vicinity of the vehicle door 2, and a human hand is not likely to approach or be in contact with the door handle 3 at that time. As described above, the driving time TW of the antenna 21 is closely related to a possibility of a human hand approaching or being in contact with the sensor 32.

The sensor control based on antenna driving (refer to FIG. 7) uses the relationship. That is, in the sensor control based on antenna driving, the sensitivity of the sensor 32 changes according to the driving time TW of the antenna 21. Specifically, when the driving time TW of the antenna 21 is short, that is, when a hand is not likely to approach or be in contact with the sensor 32, the sampling period is relatively long. When the driving time TW of the antenna 21 is long, that is, when a hand is likely to approach or be in contact with the sensor 32, the sampling period is relatively short. According to such control, power consumption in the sensor device 30 when a hand is not likely to approach or be in contact with the sensor 32 can be reduced. Meanwhile, it is possible to maintain a high responsivity with respect to detection of a hand approaching or being in contact with the sensor 32 when the hand is likely to approach or be in contact with the sensor 32. Note that, an effect of the latter is exhibited when the person gets in the vehicle. The reason that the effect is not exhibited when the person gets out of the vehicle is that the communication device 20 performs the matching with respect to the portable device 23 after a locking operation (an operation in which a hand approaches or comes into contact with the locking sensor 32B) is performed (refer to <4> described with reference to FIG. 8). Therefore, the sensor control based on antenna driving (refer to FIG. 7) may be executed only when it is determined that a person gets in the vehicle (for example, when the vehicle door 2 is in the locking state and the matching with respect to the portable device 23 has been completed).

In addition, in the sensor control based on antenna driving, the sampling period of the sensor 32 is further lengthened when the driving of the antenna 21 is stopped (that is, the sampling period is set to the third period). Accordingly, power consumption in the sensor device 30 can be further reduced.

Hereinafter, an effect of the vehicle door locking system 10 will be described.

(1) The vehicle door locking system 10 includes the sensor device 30 and the control circuit 13 (sensor controller) that controls the sensor device 30. The control circuit 13 changes the control state of the sensor device 30 on the basis of information output from the antenna driving detection circuit 60. The sensor device 30 is not controlled using only regulation control set in advance, and the control state thereof changes on the basis of new information obtained from other devices. As described above, the vehicle door locking system 10 is capable of various operations.

(2) The vehicle door locking system 10 further includes the portable device 23 and the communication device 20 that communicates with the portable device 23. According to the configuration, the vehicle door locking system 10 detects the portable device 23.

(3) In the vehicle door locking system 10, the control circuit 13 sets a period of sampling executed by the sensor device 30 to be short when the driving time TW of the antenna 21 is long. A length of the driving time TW of the antenna 21 indicates whether a person is present in the vicinity of the vehicle door 2. A long driving time TW of the antenna 21 indicates that a person is present within a detection area of the communication device 20. In the above-described configuration, the control circuit 13 sets the period of the sampling executed by the sensor device 30 to be short when the driving time TW of the antenna 21 is long. In other words, before the driving time TW of the antenna 21 becomes long, the period of the sampling executed by the sensor device 30 is long. According to such control, it is possible to maintain a substantially high responsivity of the sensor device 30 while reducing power consumption in the sensor device 30.

Second Example

Figure 9:
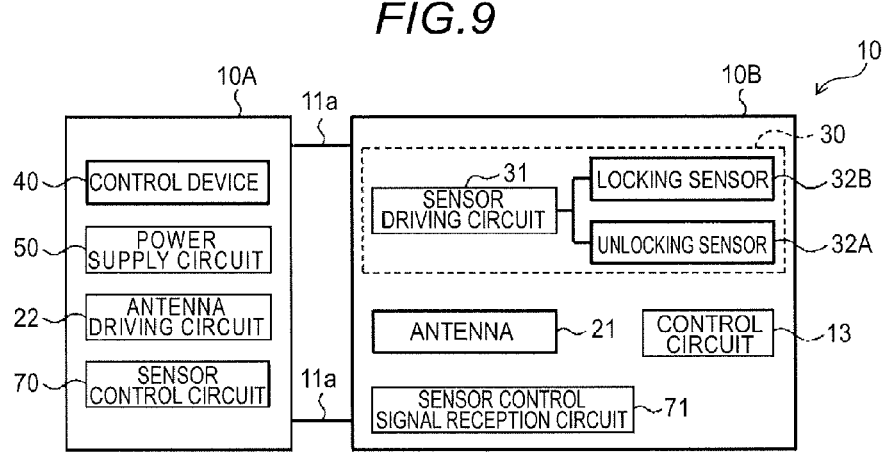
FIG. 9 is a block diagram of a second example of the vehicle door locking system.

With reference to FIG. 9, another example of the configuration of the vehicle door locking system 10 will be described.

In the example shown in FIG. 9, the vehicle door locking system 10 includes a power supply circuit 50, a sensor control circuit 70, and a sensor control signal reception circuit 71 in addition to the control device 40, the sensor device 30 and the communication device 20. The circuit configuration of the vehicle door locking system 10 is equivalent to the circuit configuration shown in FIG. 4. In this example, the communication device 20 may be omitted.

The sensor control circuit 70 outputs a signal (hereinafter, "sensor control signal") for controlling the sensor device 30 on the basis of information (refer to below) output from the various devices built into the vehicle 1. The sensor control signal is output in a period of time in which the antenna 21 is not driven (inter-driving period in the intermittent driving).

Specifically, the sensor control circuit 70 outputs the sensor control signal (hereinafter, "low-resolution command") to operate the sensor device 30 using low-resolution control (refer to below) when receiving information related to noise in detection of the sensor 32 from the various devices built into the vehicle 1.

Examples of the information related to noise in detection of the sensor 32 include water detection output from the sensor device 30 (refer to eleventh example), rainfall information output from a raindrop detection sensor, rainfall information estimated on the basis of a temperature sensor and a humidity sensor, rainfall information output from an information terminal, electromagnetic wave information output from an electromagnetic wave detection device that detects intense electromagnetic waves, and the like.

The sensor control signal reception circuit 71 is built into the door handle 3, and receives the sensor control signal. In addition, the sensor control signal reception circuit 71 operates the sensor driving circuit 31 according to the sensor control signal when receiving the sensor control signal. Specifically, the sensor control signal reception circuit 71 operates the sensor device 30 using high-resolution control (refer to below) when not receiving the low-resolution command. The sensor control signal reception circuit 71 operates the sensor device 30 using the low-resolution control when receiving the low-resolution command.

The sensor driving circuit 31 of the sensor device 30 executes the detection of the amount of change in capacitance in any one mode of a low-resolution detection mode and a high-resolution detection mode. A low resolution means a resolution lower than a reference resolution, and a high resolution means a resolution higher than the reference resolution. A resolution is a value indicating the detectable amount of change in the detection of the amount of change in capacitance, and a resolution becomes high as the detectable amount of change becomes low. The reference resolution is set to be higher than a resolution (corresponding to the low resolution) at which the amount of change in capacitance occurring due to contact with a human hand can be detected accurately.

The basic circuit configuration of the sensor driving circuit 31 in the second example and the configuration of the sensor driving circuit 31 in the first example are equivalent to each other and are different from each other in the following points. Capacitance of the reference capacitor CS of the sensor driving circuit 31 in the first example is not variable. However, capacitance of the reference capacitor CS in the second example is variable.

Figure 10:
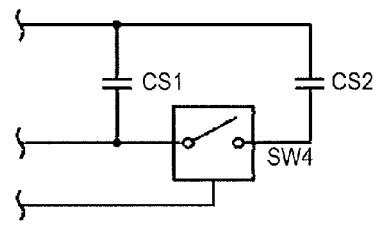
FIG. 10 is a circuit diagram illustrating a portion of a sensor control circuit.

With reference to FIG. 10, an example of the reference capacitor CS with variable capacitance will be described.

As shown in FIG. 10, the reference capacitor CS is configured of two sub capacitors CS1 and CS2. The two sub capacitors CS1 and CS2 are connected in parallel, and the fourth switch SW4 connects and disconnects the two sub capacitors CS1 and CS2 to and from each other. When the amounts of change in capacitance of the sensors 32 are the same, the number of switching operations increases as the capacitance of the reference capacitor CS increases. Therefore, when the two sub capacitors CS1 and CS2 are connected in parallel and the reference capacitor CS is configured of two sub capacitors CS1 and CS2, the amount of change in capacitance of the sensors 32 can be detected at a high resolution. When the two sub capacitors CS1 and CS2 are not connected to each other and the reference capacitor CS is configured of one sub capacitor CS1 (or CS2), the amount of change in capacitance of the sensors 32 can be detected at a low resolution.

The fourth switch SW4 is controlled by the sensor control signal reception circuit 71. Specifically, when the sensor control signal reception circuit 71 receives the low-resolution command output from the sensor control circuit 70 of the vehicle 1, the sensor control signal reception circuit 71 controls the fourth switch SW4 for disconnection so that the two sub capacitors CS1 and CS2 are disconnected. Accordingly, the sensor driving circuit 31 operates in the low-resolution detection mode (low-resolution control). When the sensor driving circuit 31 operates in the high-resolution detection mode (high-resolution control), the sensor driving circuit 31 detects the amount of change in capacitance in several stages. Specifically, the sensor driving circuit 31 classifies the differences in the number of switching operations ΔN as the amounts of change in capacitance into groups of "large" (larger than a second number), "medium" (equal to or smaller than the second number and equal to or greater than a first number), and "small" (smaller than the first number). When the difference is "large", it is determined that there is contact with an object, when the difference is "medium", it is determined that there is approaching of an object or there is an object nearby, and when the difference is "small", it is determined that there is no object detected. In addition, when the sensor driving circuit 31 operates in the low-resolution detection mode, the sensor driving circuit 31 detects the amount of change in capacitance in two stages. Specifically, the sensor driving circuit 31 classifies the differences in the number of switching operations ΔN as the amounts of change in capacitance into groups of "large" (larger than the first number), and "small" (smaller than the first number).

Next, an operation of the vehicle door locking system 10 according to the second example will be described.

When water adheres to the door handle 3, the following occurs. That is, the capacitance of the sensor 32 changes according to change in water amount, change in the size of an area to which water adheres, and the like. For this reason, a determination accuracy in determination on whether there is approaching of a hand or contact with a hand is lowered. Therefore, when the sensor driving circuit 31 operates in the high-resolution detection mode with water adhering to the door handle 3, the frequency of erroneous detection may increase. In addition, when a transmission line tower that generates intense electromagnetic waves is in the vicinity of the vehicle 1, the intense electromagnetic waves cause noise in the sensor 32. Therefore, when the sensor driving circuit 31 operates in the high-resolution detection mode in such a situation, the frequency of erroneous detection may increase.

In contrast to this, the vehicle door locking system 10 according to the second example includes the sensor control circuit 70 that receives rainfall information or electromagnetic waves. When the sensor control circuit 70 receives rainfall information or electromagnetic waves, the sensor control circuit 70 outputs the sensor control signal (low-resolution command). Furthermore, when the sensor control signal reception circuit 71 receives the sensor control signal (low-resolution command), the sensor control signal reception circuit 71 operates the sensor device 30 using the low-resolution control. That is, when detection accuracy of the sensor 32 is supposed to be low, a resolution of the sensor device 30 is lowered. As described above, according to the vehicle door locking system 10 in the second example, in a normal situation (a situation where there is no rain or electromagnetic waves), it is possible to detect a hand with a high sensitivity (that is, it is possible to perform non-contact detection), and in a situation where water adheres to the door handle or electromagnetic waves exist, it is possible to suppress erroneous detection of contact with a hand or the like.

Hereinafter, an effect of the vehicle door locking system 10 will be described.

(1) The sensor device 30 executes the high-resolution control and the low-resolution control. The sensor control circuit 70 (sensor controller) switches the control state of the sensor device 30 between the high-resolution control and the low-resolution control on the basis of presence or absence of information related to noise in detection of the amount of change in capacitance.

When noise in detection of the amount of change in capacitance of the sensor 32 is increased, the detection accuracy of the sensor device 30 is lowered. Particularly, in a case where the sensor device 30 is operated according to the high-resolution control and detects a small change in capacitance, an influence of the noise is increased and a decrease in detection accuracy becomes significant. In this regard, in the above-described configuration, the control state of the sensor device 30 switches between the high-resolution control and the low-resolution control on the basis of information related to noise in detection of the amount of change in capacitance. Accordingly, a decrease in detection accuracy of the sensor device 30 is suppressed.

(2) The information related to noise in detection of the amount of change in capacitance is rainfall information output from the information terminal, water detection of the sensor device 30, or electromagnetic wave information. The rainfall information indicates that water will adhere to the sensor device 30 in future or there is water adhering to the sensor device 30 at a current time. The water detection indicates that there is water approaching or being in contact with the sensor 32. The water adhering to the sensor causes noise. In addition, electromagnetic waves cause noise in the sensor device 30. That is, new information as described above influences the detection accuracy of the sensor device 30. In this regard, in the above-described configuration, the sensor device 30 is operated according to the low-resolution control when there is new information as described above. According to the configuration, it is possible to suppress the erroneous detection of the sensor device 30 which occurs when there is rainfall or interfering electromagnetic waves.

In the second example, the sensor control circuit 70 switches the control state of the sensor device 30 between the high-resolution control and the low-resolution control on the basis of presence or absence of the information related to noise in detection of the amount of change in capacitance. Instead of this, the sensor control circuit 70 may be configured as follow. The sensor control circuit 70 switches the control state between the high-resolution control, the low-resolution control, and a combination of the high-resolution control and the low-resolution control on the basis of presence or absence of the information related to noise. The combination of the high-resolution control and the low-resolution control may be executed when the noise is weak or noise is generated infrequently. In the combination of the high-resolution control and the low-resolution control, the both controls may be executed alternately at a ratio of 1:1, and may be executed at a ratio with inequivalent values of 2:1 or the like.

Third Example

Figure 11:
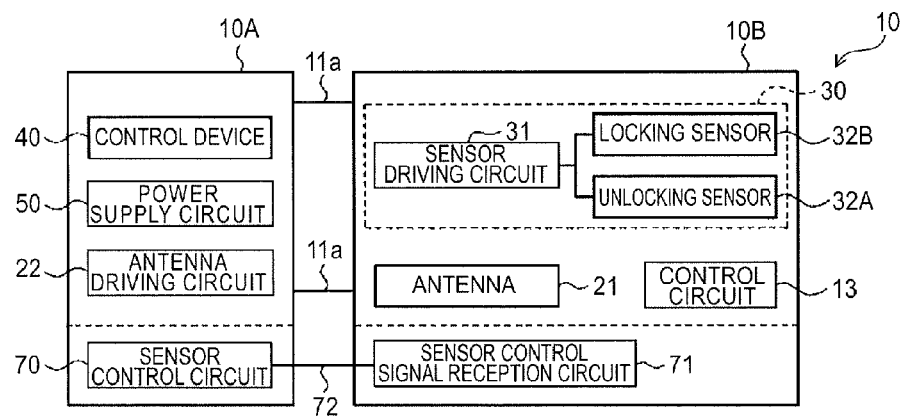
FIG. 11 is a block diagram of a third example of the vehicle door locking system.

With reference to FIG. 11, another example of the configuration of the vehicle door locking system 10 will be described.

The configuration in the example shown in FIG. 11 is equivalent to the configuration of the vehicle door locking system 10 in the second example (refer to FIG. 9). The third example is different from the second example in that the sensor control circuit 70 built into the vehicle 1 and the sensor control signal reception circuit 71 built into the door handle 3 are connected to each other via a dedicated connection line 72. According to the configuration, interference between a signal output from the sensor control circuit 70 and other signals can be suppressed.

Fourth Example

Figure 12:
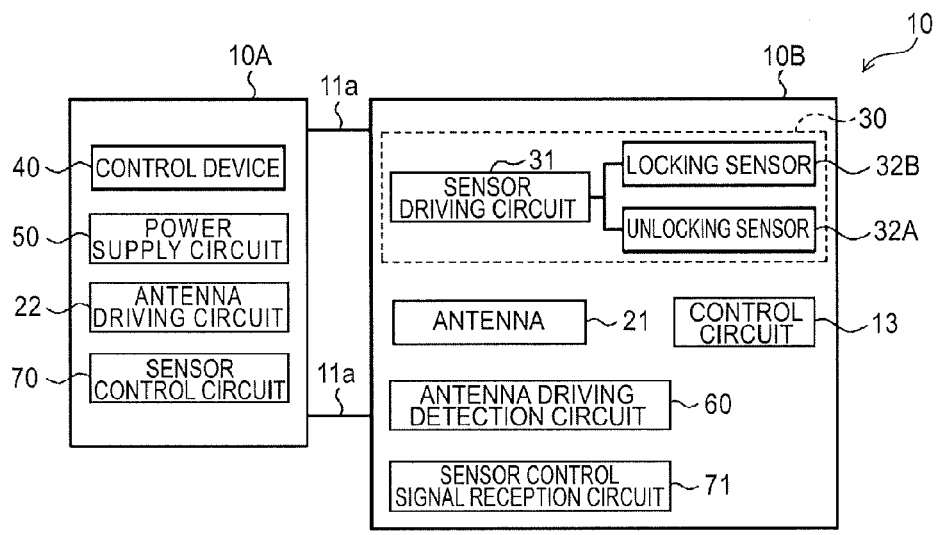
FIG. 12 is a block diagram of a fourth example of the vehicle door locking system.

With reference to FIG. 12, still another example of the configuration of the vehicle door locking system 10 will be described.

The configuration in the example shown in FIG. 12 is equivalent to the configuration of the vehicle door locking system 10 in the first example (refer to FIG. 2). The fourth example is different from the first example in that the sensor control circuit 70 and the sensor control signal reception circuit 71 are provided. That is, the vehicle door locking system 10 in the fourth example includes components in the second example in addition to components in the first example. Therefore, the vehicle door locking system 10 in the fourth example exhibits the effects of both examples.

Fifth Example

Figure 13:
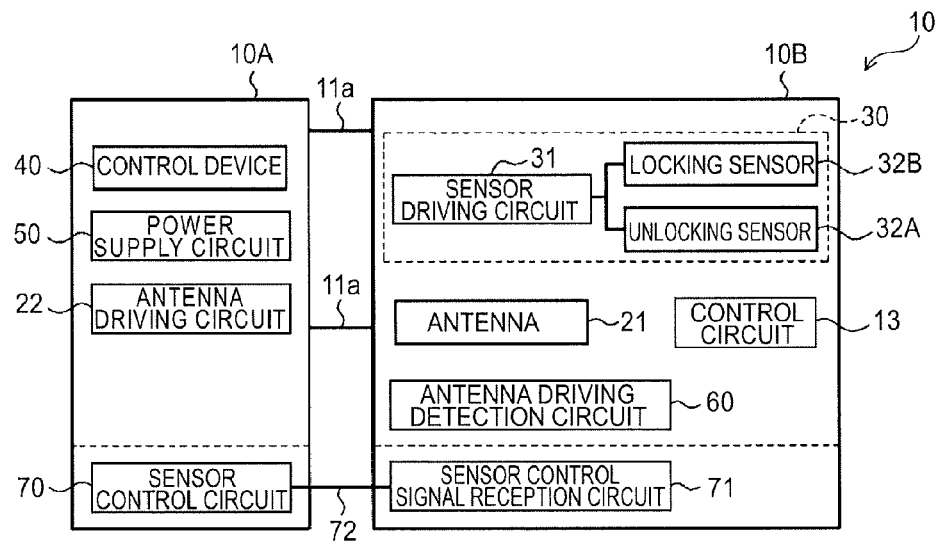
FIG. 13 is a block diagram of a fifth example of the vehicle door locking system.

With reference to FIG. 13, still another example of the configuration of the vehicle door locking system 10 will be described.

The configuration in the example shown in FIG. 13 is equivalent to the configuration of the vehicle door locking system 10 in the fourth example (refer to FIG. 12). The fifth example is different from the fourth example in that the sensor control circuit 70 built into the vehicle 1 and the sensor control signal reception circuit 71 built into the door handle 3 are connected to each other via the dedicated connection line 72. That is, the vehicle door locking system 10 in the fifth example includes components in the first, second, and third examples. Therefore, the vehicle door locking system 10 in the fifth example exhibits the effects of the three examples.

Sixth Example

Figure 14A:
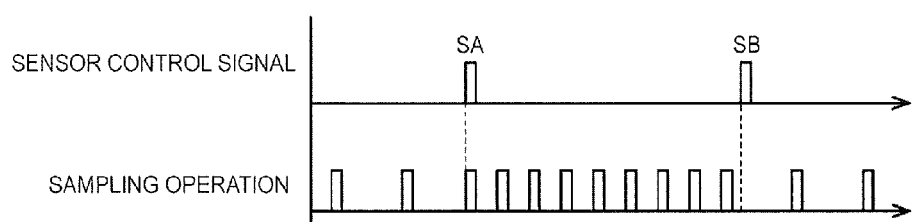
FIGS. 14A to 14C are timing charts of sensor control signals and sampling operations.
Figure 14B:
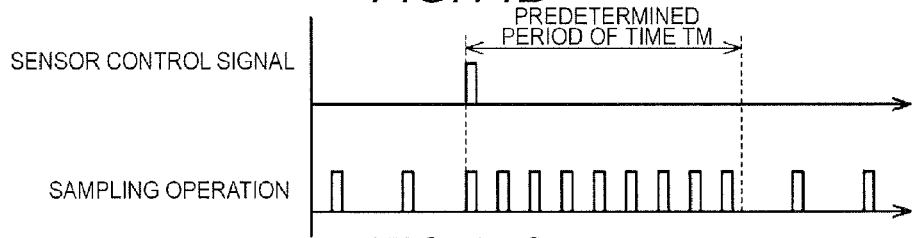
Figure 14C:
Figure 15:
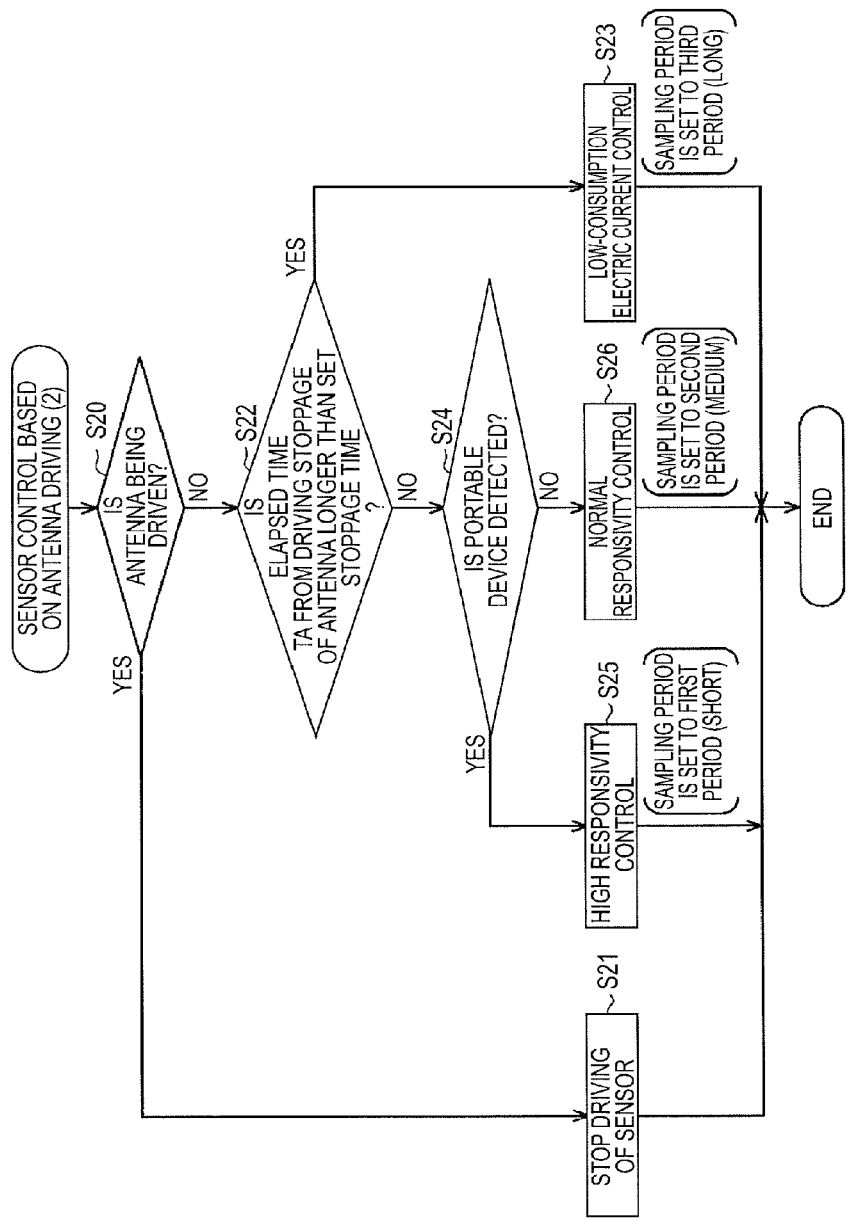
FIG. 15 is a flow chart of "sensor control based on antenna driving (2)"

With reference to FIGS. 14A to 15, still another example of the configuration of the vehicle door locking system 10 will be described.

The vehicle door locking system 10 according to the sixth example includes the vehicle door locking system 10 according to the fourth example (refer to FIG. 12) or the fifth example (refer to FIG. 13). The vehicle door locking system 10 controls the sensor device 30 on the basis of information related to the portable device 23 output from the communication device 20 and information related to antenna driving.

The vehicle door locking system 10 controls responsivity of the sensor 32 on the basis of presence or absence of the portable device 23 detected when an elapsed time TA from the driving stoppage of the antenna 21 is equal to or shorter than the set stoppage time.

The sensor control circuit 70 acquires information indicating that the portable device 23 is detected (hereinafter, "detection information") from the communication device 20 or a vehicle ECU 5. The detection information is formed by a communication controller in the communication device 20 when the communication device 20 receives the response signal transmitted by the portable device 23. The vehicle ECU 5 outputs information of which contents are the same as that in the detection information to other devices on the basis of the detection information output by the communication controller in the communication device 20.

When the sensor control circuit 70 acquires the detection information, the sensor control circuit 70 outputs the information to the sensor unit 10B as the sensor control signal.

When the sensor control signal reception circuit 71 receives the sensor control signal, the sensor control signal reception circuit 71 outputs a predetermined command to the sensor driving circuit 31 on the basis of the reception. The sensor driving circuit 31 controls the sensor 32 on the basis of the command.

With reference to FIGS. 14A to 14C, an example of the sensor control signal output from the sensor control circuit 70 will be described.

The sensor control signal is output in any one of modes shown in FIGS. 14A to 14C.

The sensor control signal shown in FIG. 14A is a signal indicating a period of time from when the portable device 23 is detected to when the portable device 23 becomes not detectable. The sensor control signal is configured of a start signal SA and a termination signal SB. The start signal SA is a signal indicating a time point when the portable device 23 is detected and the termination signal SB is a signal indicating that the portable device 23 becomes not detectable. When the sensor control signal reception circuit 71 receives the start signal SA, the sensor control signal reception circuit 71 commands the sensor device 30 so that the control state of the sensor 32 changes to a predetermined control state. Furthermore, when the sensor control signal reception circuit 71 receives the termination signal SB, the sensor control signal reception circuit 71 commands the sensor device 30 so that the control state of the sensor 32 returns to the original control state, on the basis of the reception.

The sensor control signal shown in FIG. 14B is a signal indicating a case where the portable device 23 is detected. When the sensor control signal reception circuit 71 receives the sensor control signal, the sensor control signal reception circuit 71 commands the sensor device 30 so that the control state of the sensor 32 changes to the predetermined control state over a predetermined period of time TM after the reception.

The sensor control signal shown in FIG. 14C is a signal indicating a period of time from when the portable device 23 is detected to when the portable device 23 becomes not detectable. The sensor control signal is a signal continuously output over a period of time for which the portable device 23 is detectable. When the sensor control signal reception circuit 71 receives the sensor control signal, the sensor control signal reception circuit 71 commands the sensor device 30 so that the control state of the sensor 32 changes to the predetermined control state over a period of time for which the sensor control signal reception circuit 71 receives the sensor control signal.

With reference to FIG. 15, control which the control circuit 13 executes ("sensor control based on antenna driving (2)") will be described.

In Step S20, the control circuit 13 determines whether the antenna 21 is being driven or not on the basis of a signal output from the antenna driving detection circuit 60. Here, the antenna 21 being driven means that the antenna 21 is operated at a predetermined frequency, and a driving stoppage of the antenna 21 means that the antenna 21 is not operated. That is, the idea of a driving stoppage of the antenna 21 includes a driving stoppage period which is an inter-driving period of the antenna 21 being subject to the intermittent driving and a complete stoppage period in which the intermittent driving is stopped.

When it is determined that the antenna 21 is being driven in Step S20 (YES), the control circuit 13 stops the driving of the sensor driving circuit 31 (Step S21). This is for suppressing interference between a signal for antenna driving and a signal (detection determination result) output from the sensor driving circuit 31 which may occur when the antenna driving and the sensor driving are executed at the same time in the circuit configuration shown in FIG. 4.

When it is determined that the antenna 21 is not being driven in Step S20 (NO), the control circuit 13 executes Step S22.

In Step S22, it is determined whether the elapsed time TA from the driving stoppage of the antenna 21 is longer than the set stoppage time. That is, in this process, it is determined whether the intermittent driving of the antenna 21 is executed. The set stoppage time is set to be slightly longer than the inter-driving period in the intermittent driving.

When the elapsed time TA from the driving stoppage of the antenna 21 is longer than the set stoppage time (YES), the control circuit 13 executes the low-consumption electric current control with respect to the sensor driving circuit 31 (Step S23).

When the elapsed time TA from the driving stoppage of the antenna 21 is equal to or shorter than the set stoppage time (NO), the control circuit 13 determines whether the portable device 23 is detected in Step S24. When the portable device 23 is detected, the sensor driving circuit 31 is controlled so that the sensor 32 exhibits a high responsivity (Step S25: high responsivity control). When the portable device 23 is not detected, the sensor driving circuit 31 is controlled so that the sensor 32 exhibits a normal responsivity (Step S26: normal responsivity control). Note that, the low-consumption electric current control, the high responsivity control, and the normal responsivity control are the same as those above-described in "sensor control based on antenna driving (1)".

Hereinafter, an effect of the vehicle door locking system 10 will be described.

(1) In the vehicle door locking system 10, the control circuit 13 (sensor controller) sets a period of the sampling executed by the sensor device 30 to be long when the driving stoppage time of the antenna 21 is longer than the set stoppage time.

When the parking time of the vehicle 1 is long, the driving of the antenna 21 stops. In other words, the driving stoppage of the antenna 21 indicates that the vehicle 1 is parked for a long time. When driving of the sensor device 30 continues in such a situation while maintaining a normal responsivity, the amount of electric power charged in a storage battery which is built into the vehicle 1 decreases due to power consumption in the sensor device 30, which may hinder start-up of the vehicle. In this regard, in the above-described configuration, the control circuit 13 sets a period of the sampling executed by the sensor device 30 to be long when the driving stoppage time of the antenna 21 is longer than the set stoppage time. For this reason, according to the above-described configuration, power consumption in the sensor device 30 can be suppressed. In addition, the vehicle door locking system 10 contributes to suppressing of a decrease in amount of electric power charged in the storage battery of the vehicle 1.

(2) In the vehicle door locking system 10, the new information is the detection information of the portable device 23, and the control circuit 13 sets a period of the sampling executed by the sensor device 30 to be short when the portable device 23 is detected.

Detection of the portable device 23 indicates that there is a person in the vicinity of the vehicle door 2. In the configuration, when the portable device 23 is detected, a period of the sampling executed by the sensor device 30 is set to be short. In other words, when the portable device 23 is not detected, a period of the sampling executed by the sensor device 30 is long. According to such control, it is possible to maintain a substantially high responsivity of the sensor 32 while reducing power consumption in the sensor device 30.

Seventh Example

Figure 16:
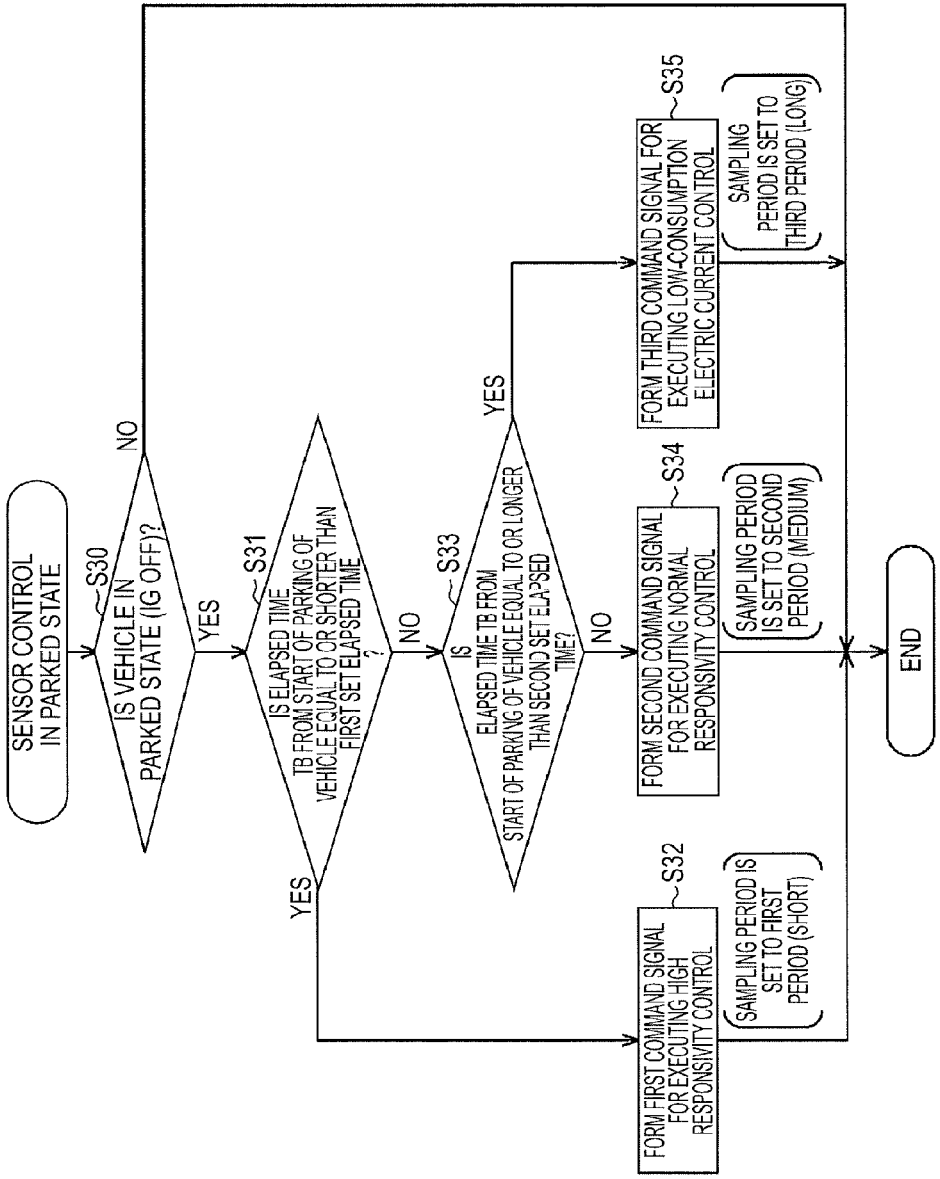
FIG. 16 is a flow chart of "sensor control in a parked state"

With reference to FIG. 16, another example of the configuration of the vehicle door locking system 10 will be described.

The configuration of the vehicle door locking system 10 according to this example is equivalent to the configuration of the vehicle door locking system 10 according to any one of the second to fifth examples, and the communication device 20 may be omitted therefrom. The vehicle door locking system 10 controls the sensor device 30 on the basis of operation information of the ignition switch 4 in the vehicle 1.

The sensor control circuit 70 acquires information (hereinafter, "parking information") indicating a parked state of the vehicle 1 (vehicle parked state) from the vehicle ECU 5. The parking information is formed on the basis of the ignition switch 4 being switched from ON to OFF in the vehicle ECU 5, for example.

When the sensor control circuit 70 acquires the parking information, the sensor control circuit 70 obtains an elapsed time TB from when the parking starts on the basis of the parking information, and outputs a predetermined command according to the elapsed time TB to the sensor unit 10B as the sensor control signal.

When the sensor control signal reception circuit 71 receives the sensor control signal, the sensor control signal reception circuit 71 outputs a predetermined command to the sensor driving circuit 31 on the basis of the reception. The sensor driving circuit 31 controls the sensor 32 on the basis of the command.

With reference to FIG. 16, control ("sensor control based on a parked state") executed by the sensor control circuit 70 will be described.

In Step S30, the sensor control circuit 70 acquires information related to parking of the vehicle 1 from the vehicle ECU 5. When the sensor control circuit 70 acquires the parking information (Step S30: YES), the sensor control circuit 70 executes Step S31. In Step S31, it is determined whether the elapsed time TB from when the parking starts is equal to or shorter than a first set elapsed time.

When it is determined that the elapsed time TB from when the parking starts is equal to or shorter than the first set elapsed time in Step S31 (YES), the sensor control circuit 70 outputs a first command signal (Step S32). The first command signal is a signal for causing the sensor driving circuit 31 to execute the high responsivity control. Accordingly, the sensor 32 exhibits a high responsivity. When it is determined that the elapsed time TB is longer than the first set elapsed time in Step S31 (NO), it is determined whether the elapsed time TB from when the parking starts is equal to or longer than a second set elapsed time in Step S33. Note that, the second set elapsed time is longer than the first set elapsed time.

When it is determined that the elapsed time TB is shorter than the second set elapsed time in Step S33 (NO), the sensor control circuit 70 outputs a second command signal (Step S34). The second command signal is a signal for causing the sensor driving circuit 31 to execute the normal responsivity control. When it is determined that the elapsed time TB is equal to or longer than the second set elapsed time in Step S33 (YES), the sensor control circuit 70 outputs a third command signal (Step S35). The third command signal is a signal for causing the sensor driving circuit 31 to execute the low-consumption electric current control.

Hereinafter, an effect of the vehicle door locking system 10 will be described.

The sensor control circuit 70 (sensor controller) outputs a command to set a period of the sampling executed by the sensor device 30 to be long according to the length of the elapsed time TB.

The elapsed time TB from when the parking of the vehicle 1 starts indicates a clearance between the vehicle 1 and a person getting out of the vehicle. The clearance indicates a possibility of a human hand approaching or being in contact with the sensor 32. That is, the elapsed time TB from when the parking of the vehicle 1 starts indicates a possibility of the use of the sensor 32. In the configuration, the sensor control circuit 70 sets a period of the sampling executed by the sensor device 30 to be long according to the length of the elapsed time TB. Accordingly, the sensor 32 is operated with a high responsivity when there is a high possibility of the use of the sensor 32, and the sensor 32 is operated with a low responsivity when there is a low possibility of the use of the sensor 32. According to such a configuration, a user is unlikely to feel that the responsivity of the sensor 32 is low, and it is possible to reduce power consumption in the sensor device 30.

Eighth Example

Figure 17:
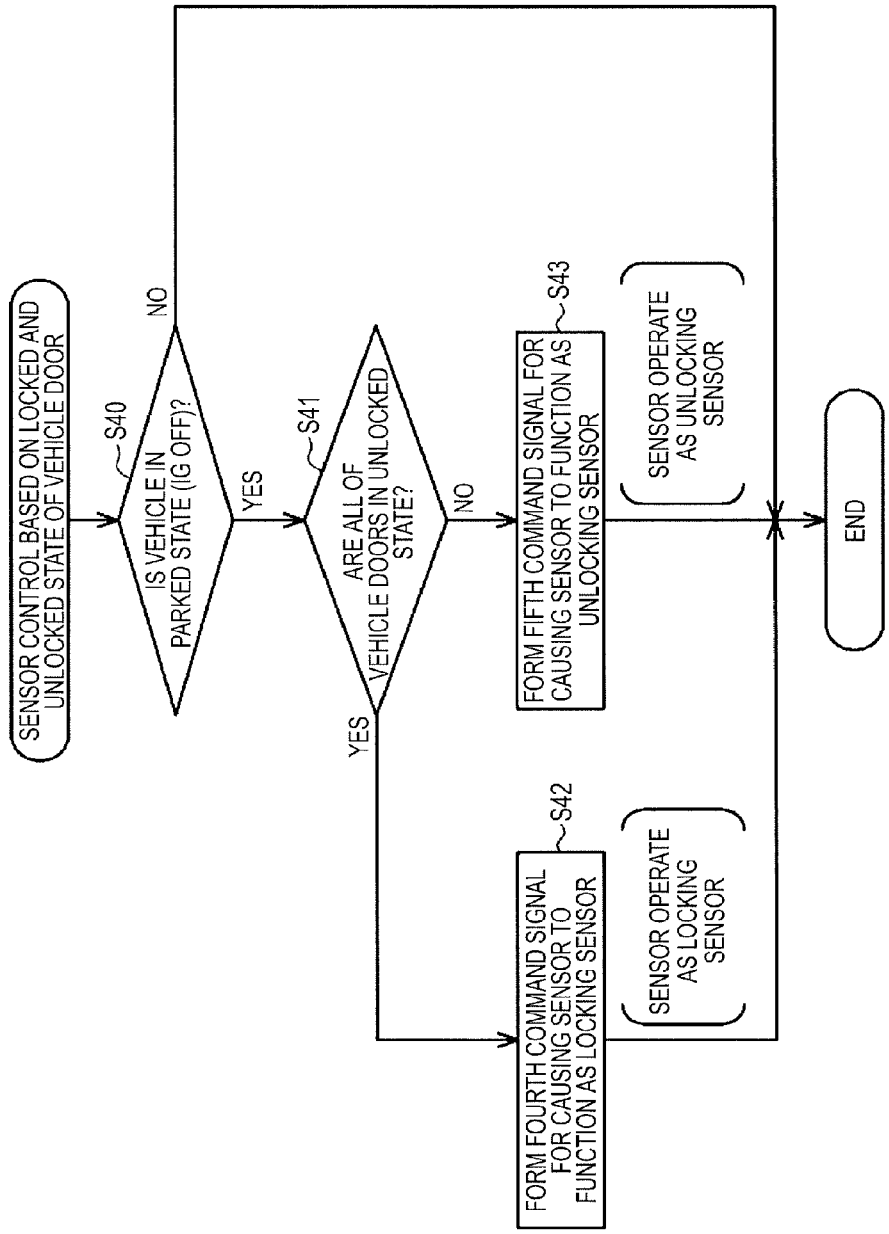
FIG. 17 is a flow chart of "sensor control based on a locked and unlocked state of the vehicle door"

With reference to FIG. 17, another example of the configuration of the vehicle door locking system 10 will be described.

The configuration of the vehicle door locking system 10 according to this example is equivalent to the configuration of the vehicle door locking system 10 according to any one of the second to fifth examples, and the communication device 20 may be omitted therefrom. The vehicle door locking system 10 controls the sensor device 30 on the basis of the operation information of the ignition switch 4 in the vehicle 1 and door opening and closing information output from the vehicle ECU 5 or the vehicle door 2.

The difference between the configuration according to the eighth example and the configuration according to the fourth example (refer to FIG. 12) will be described.

The vehicle door locking system 10 according to the fourth example includes the unlocking sensor 32A and the locking sensor 32B. However, in the eighth example, the number of sensors 32 is one, and the one sensor 32 is used in different manners depending on the situation. That is, the sensor 32 is controlled so that the sensor 32 functions as the unlocking sensor 32A at the time of boarding and functions as the locking sensor 32B at the time of alighting.

The sensor control circuit 70 acquires information (hereinafter, "parking information") indicating a parked state of the vehicle 1 (vehicle parked state) from the vehicle ECU 5. Furthermore, the sensor control circuit 70 acquires information (hereinafter, "vehicle door information") related to a locked state or an unlocked state of the vehicle door 2 from the vehicle ECU 5 or the vehicle door 2.

When the sensor control circuit 70 acquires the parking information or the vehicle door information, the sensor control circuit 70 estimates a requested function of the sensor 32 from the information, and outputs a command related to a function of the sensor to the sensor unit 10B as the sensor control signal. When the sensor control signal reception circuit 71 receives the sensor control signal, the sensor control signal reception circuit 71 outputs a predetermined command to the sensor driving circuit 31 on the basis of the reception. The sensor driving circuit 31 controls the sensor 32 on the basis of the command. The sensor control circuit 70 receives a signal output from the sensor driving circuit 31 as a signal based on the requested function (a function as the locking sensor or a function as the unlocking sensor).

With reference to FIG. 17, control which the sensor control circuit 70 executes ("sensor control based on a locked and unlocked state of the vehicle door") will be described.

In Step S40, the sensor control circuit 70 acquires information related to the parking of the vehicle 1 from the vehicle ECU 5. When the sensor control circuit 70 acquires the parking information (Step S40: YES), the sensor control circuit 70 executes Step S41. In Step S41, the sensor control circuit 70 acquires information on whether all of the vehicle doors 2 are in the unlocked state.

When it is determined that all of the vehicle doors 2 are in the unlocked state in Step S41 (YES), the sensor control circuit 70 outputs a fourth command signal (Step S42). The fourth command signal is a signal for causing the sensor 32 to function as the locking sensor 32B. Furthermore, the sensor control circuit 70 regards a signal output from the sensor driving circuit 31 on the basis of object detection as a signal for transition of the vehicle door 2 to the locked state, and determines whether there is a locking operation by a person on the basis of presence or absence of the signal.

When it is determined that not all of the vehicle doors 2 are in the unlocked state in Step S41 (NO), that is, at least one of the vehicle doors 2 is in the locked state, the sensor control circuit 70 executes a process in Step S43. In Step S43, the sensor control circuit 70 outputs a fifth command signal.

The fifth command signal is a signal for causing the sensor 32 to function as the unlocking sensor 32A. Furthermore, the sensor control circuit 70 regards a signal output from the sensor driving circuit 31 on the basis of object detection as a signal for transition of the vehicle door 2 to the unlocked state, and determines whether there is an unlocking operation by a person on the basis of presence or absence of the signal.

Hereinafter, an effect of the vehicle door locking system 10 will be described.

When all of the vehicle doors 2 are in the unlocked state, the sensor control circuit 70 (sensor controller) determines whether there is a locking operation on the basis of output of the sensor device 30. When it is determined that not all of the vehicle doors 2 are in the unlocked state, the sensor control circuit 70 determines whether there is an unlocking operation on the basis of output of the sensor device 30.

In the above-described configuration, the meaning of a signal output from the sensor device 30 changes depending on the locked and unlocked state of the vehicle door 2. That is, as in the above-described configuration, when all of the vehicle doors 2 are in the unlocked state, the sensor control circuit 70 regards the sensor device 30 as the locking sensor 32B, and determines whether there is a locking operation on the basis of output of the sensor device 30. When it is determined that not all of the vehicle doors 2 are in the unlocked state, the sensor control circuit 70 regards the sensor device 30 as the unlocking sensor 32A, and determines whether there is an unlocking operation on the basis of output of the sensor device 30. According to such control, a portion of the sensor device 30 for detecting the locking operation and a portion of the sensor device 30 for detecting the unlocking operation can be the same portion, and thus the sensor device 30 can be miniaturized.

Ninth Example

Figure 18:
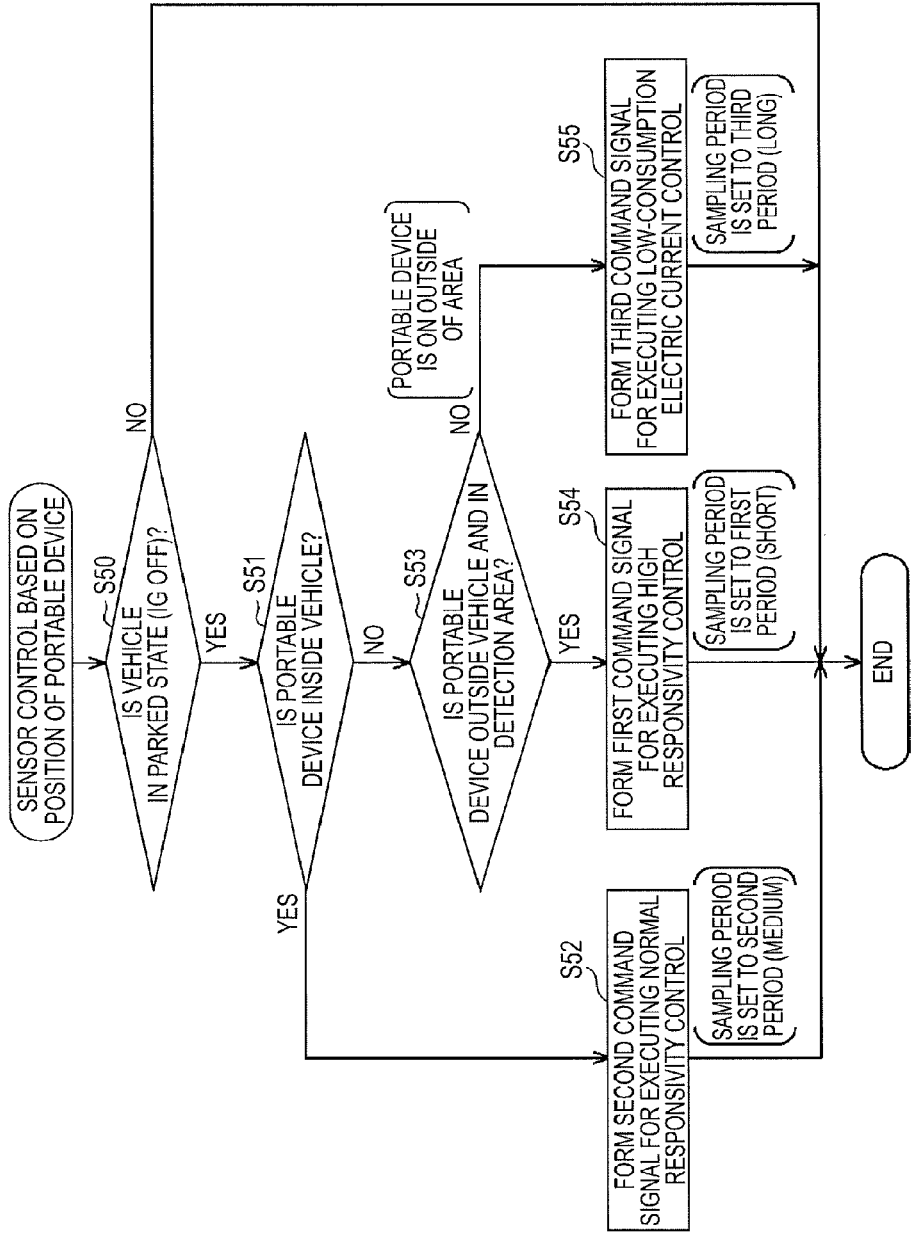
FIG. 18 is a flow chart of "sensor control based on a position of a portable device"

With reference to FIG. 18, still another example of the configuration of the vehicle door locking system 10 will be described.

The configuration of the vehicle door locking system 10 according to this example is equivalent to the configuration of the vehicle door locking system 10 according to any one of the second to fifth examples. The vehicle door locking system 10 controls the sensor device 30 on the basis of the operation information of the ignition switch 4 in the vehicle 1 and information related to the portable device 23 output from the communication device 20.

The difference between the configuration according to the ninth example and the configuration according to the fourth example (refer to FIG. 12) will be described.

In the vehicle door locking system 10 according to the ninth example, the communication device 20 includes an antenna disposed in the vehicle (hereinafter, "in-vehicle antenna") in addition to the antenna 21 disposed in the door handle 3. The detection area of the in-vehicle antenna is the inside of the vehicle. The in-vehicle antenna is used to detect whether the portable device 23 is inside the vehicle.

The sensor control circuit 70 acquires information (hereinafter, "parking information") indicating a parked state of the vehicle 1 (vehicle parked state) from the vehicle ECU 5. Furthermore, the sensor control circuit 70 acquires information related to detection of the portable device 23 and the position of the portable device 23 from the communication device 20.

When the sensor control circuit 70 acquires the information related to detection of the portable device 23 and the position of the portable device 23, the sensor control circuit 70 outputs a predetermined command according to the position of the portable device 23 to the sensor unit 10B as the sensor control signal.

When the sensor control signal reception circuit 71 receives the sensor control signal, the sensor control signal reception circuit 71 outputs a predetermined command to the sensor driving circuit 31 on the basis of the reception. The sensor driving circuit 31 controls the sensor 32 on the basis of the command.

With reference to FIG. 18, control which the sensor control circuit 70 executes ("sensor control based on a position of a portable device") will be described.

In Step S50, the sensor control circuit 70 acquires information related to the parking of the vehicle 1 from the vehicle ECU 5. When the sensor control circuit 70 acquires the parking information (Step S50: YES), the sensor control circuit 70 executes Step S51. In Step S51, the sensor control circuit 70 acquires information on whether the portable device 23 is inside the vehicle from the communication device 20.

When the sensor control circuit 70 acquires information indicating that the portable device 23 is inside the vehicle in Step S51 (YES), the sensor control circuit 70 outputs a second command signal (Step S52). The second command signal is a signal for causing the sensor driving circuit 31 to execute the normal responsivity control.

When the sensor control circuit 70 does not acquire information indicating that the portable device 23 is inside the vehicle in Step S51 (NO), the sensor control circuit 70 executes a process in Step S53. In Step S53, the sensor control circuit 70 acquires information on whether the portable device 23 is outside the vehicle and inside the detection area.

When the sensor control circuit 70 acquires information indicating that the portable device 23 is on the outside of the vehicle and the portable device 23 is detected in Step S53 (YES), the sensor control circuit 70 outputs a first command signal (Step S54). The first command signal is a signal for causing the sensor driving circuit 31 to execute the high responsivity control.

When the sensor control circuit 70 acquires information indicating that the portable device 23 is on the outside of the vehicle and the portable device 23 is not detected in Step S53 (NO), the sensor control circuit 70 outputs a third command signal (Step S55). The third command signal is a signal for causing the sensor driving circuit 31 to execute the low-consumption electric current control.

Hereinafter, an effect of the vehicle door locking system 10 will be described.

When the portable device 23 is detected inside the vehicle, the sensor control circuit 70 (sensor controller) sets the period of the sampling executed by the sensor device 30 to be longer than that in a case where the portable device 23 is detected outside the vehicle.

The portable device 23 detected inside the vehicle indicates that there is a person in the vehicle. Therefore, there is a low possibility of the use of the sensor device 30 in this case. In the above-described configuration, when the portable device 23 is detected inside the vehicle, the sensor control circuit 70 sets the period of the sampling executed by the sensor device 30 to be longer than that in a case where the portable device 23 is detected outside the vehicle. Accordingly, power consumption in the sensor device 30 is reduced.

Tenth Example

Figure 19:
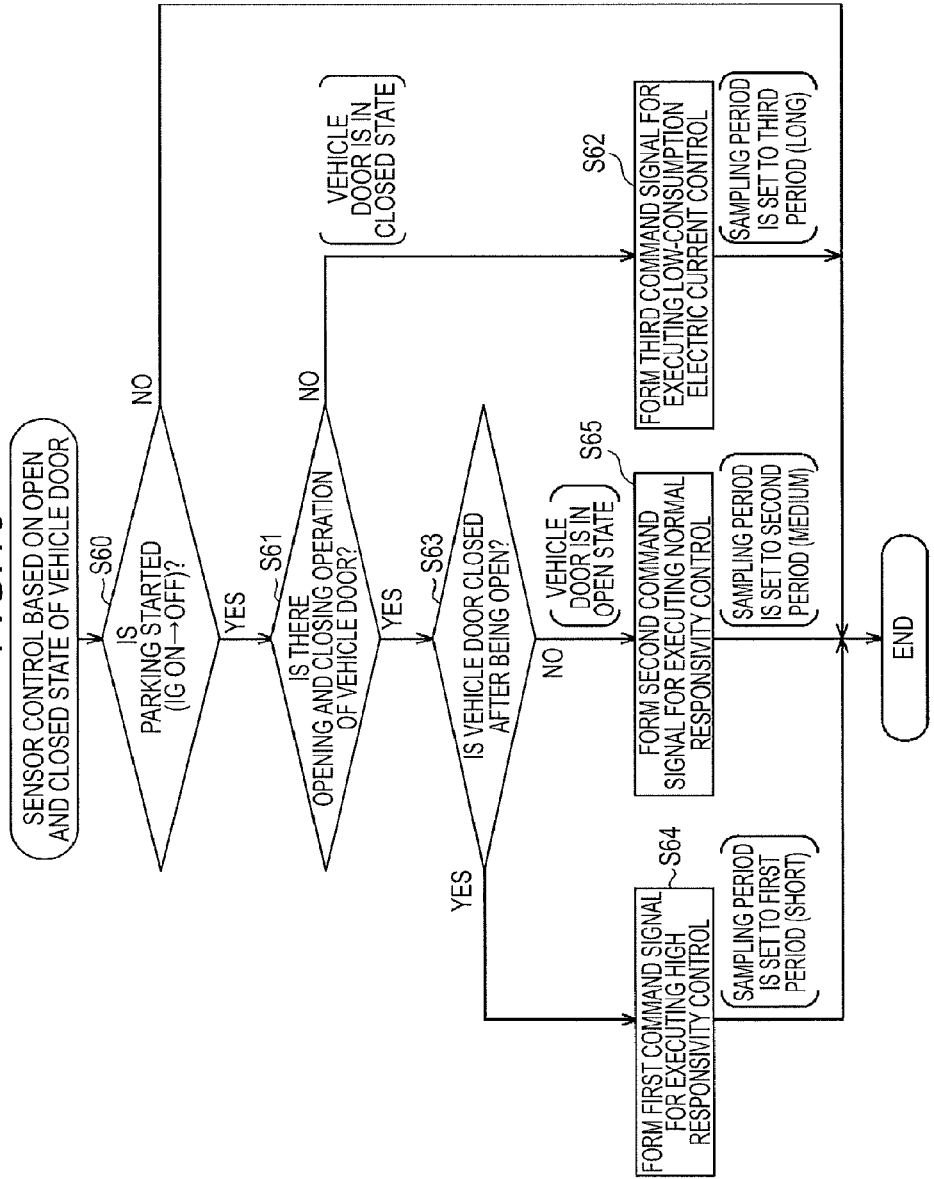
FIG. 19 is a flow chart of "sensor control based on an open and closed state of the vehicle door"

With reference to FIG. 19, still another example of the configuration of the vehicle door locking system 10 will be described.

The configuration of the vehicle door locking system 10 according to this example is equivalent to the configuration of the vehicle door locking system 10 according to any one of the second to fifth examples, and the communication device 20 may be omitted therefrom. The vehicle door locking system 10 controls the sensor device 30 on the basis of the operation information of the ignition switch 4 in the vehicle 1 and door opening and closing information output from the vehicle ECU 5.

The sensor control circuit 70 acquires information indicating the start of parking (hereinafter, "parking start information") from the vehicle ECU 5. The information related to the start of parking is formed on the basis of the ignition switch 4 being switched from ON to OFF in the vehicle ECU 5, for example. Note that, the sensor control circuit 70 acquires information related to an open and closed state of the vehicle door 2 from the vehicle door 2.

When the sensor control circuit 70 acquires the information related to an open and closed state of the vehicle door 2, the sensor control circuit 70 outputs a predetermined command according to the open and closed state of the vehicle door 2 to the sensor unit 10B as the sensor control signal.

When the sensor control signal reception circuit 71 receives the sensor control signal, the sensor control signal reception circuit 71 outputs a predetermined command to the sensor driving circuit 31 on the basis of the reception. The sensor driving circuit 31 controls the sensor 32 on the basis of the command.

With reference to FIG. 19, control which the sensor control circuit 70 executes ("sensor control based on an open and closed state of the vehicle door") will be described.

In Step S60, the sensor control circuit 70 acquires information related to the parking of the vehicle 1 from the vehicle ECU 5. When the sensor control circuit 70 acquires the parking start information (Step S60: YES), the sensor control circuit 70 executes Step S61. In Step S61, the sensor control circuit 70 acquires information on whether there is an opening and closing operation of the vehicle door 2 from the vehicle ECU 5 or the vehicle door 2.

When the sensor control circuit 70 does not acquire information indicating that there is an opening and closing operation of the vehicle door 2 in Step S61 (NO), the sensor control circuit 70 outputs a third command signal (Step S62). The third command signal is a signal for causing the sensor driving circuit 31 to execute the low-consumption electric current control.

When the sensor control circuit 70 acquires information indicating that there is an opening and closing operation of the vehicle door 2 in Step S61 (YES), the sensor control circuit 70 executes a process in Step S63. In Step S63, the sensor control circuit 70 acquires information on whether the vehicle door 2 is closed after being open.

When the sensor control circuit 70 acquires information indicating that the vehicle door 2 is closed after being open in Step S63 (YES), the sensor control circuit 70 outputs a first command signal (Step S64). The first command signal is a signal for causing the sensor driving circuit 31 to execute the high responsivity control.

When the sensor control circuit 70 does not acquire the information indicating that the vehicle door 2 is closed after being open in Step S63 (NO), the sensor control circuit 70 outputs a second command signal (Step S65). The second command signal is a signal for causing the sensor driving circuit 31 to execute the normal responsivity control.

Hereinafter, an effect of the vehicle door locking system 10 will be described.

The sensor control circuit 70 (sensor controller) sets a period of the sampling executed by the sensor device 30 to be short when the vehicle door 2 is closed.

When the vehicle door 2 is closed after being open with the vehicle 1 being parked, the locking sensor 32B in the door handle 3 is used. In the above-described configuration, the sensor control circuit 70 sets a period of the sampling executed by the sensor device 30 to be short when the vehicle door 2 is closed. For this reason, the locking operation performed when the vehicle door 2 is closed can be detected quickly.

Eleventh Example

Figure 20:
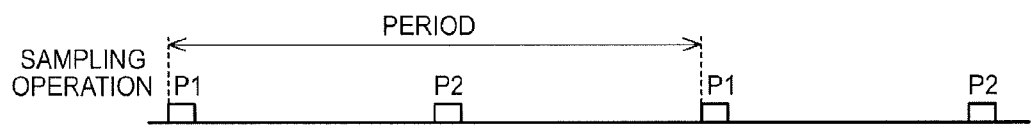
FIG. 20 is a timing chart illustrating timings of normal sampling control and additional sampling control.

With reference to FIG. 20, still another example of the configuration of the vehicle door locking system 10 will be described.

The configuration of the vehicle door locking system 10 according to this example is equivalent to the configuration of the vehicle door locking system 10 according to any one of the second to fifth examples, and the communication device 20 may be omitted therefrom. The vehicle door locking system 10 controls the sensor device 30 on the basis of rainfall forecast information.

The sensor control circuit 70 acquires a rainfall probability from the information terminal connected to the internet, and outputs a command for rain detection of the sensor 32 to the sensor unit 10B as the sensor control signal, on the basis of the information.

When the sensor control signal reception circuit 71 receives the sensor control signal, the sensor control signal reception circuit 71 outputs a predetermined command (hereinafter, "rain detection command") to the sensor driving circuit 31 on the basis of the reception. The sensor driving circuit 31 controls the sensor 32 on the basis of the rain detection command.

The sensor driving circuit 31 has a function (hereinafter, "object determination function") of determining the type of an object approaching or being in contact with the sensor 32 in addition to a function of obtaining the amount of change in capacitance as a difference in the number of switching operations ΔN. The object determination function is mainly for discriminating between water and a person. Depending on the type of an object approaching or being in contact with the sensor 32, a time constant of a change in capacitance varies. Therefore, when the sensor 32 detects a physical quantity related to the time constant, it is possible to discriminate between water and other objects (for example, a person). Specifically, the physical quantity related to the time constant is defined as a ratio between differences in the number of switching operations ΔN or a difference between differences in the number of switching operations ΔN in two switching control operations with different closure times of the switch. The closure time of the switch is a closure time of the second switch SW2 and the third switch SW3 for each switching operation.

The difference in the number of switching operations ΔN when the closure time of the second switch SW2 and the third switch SW3 is set to a first time is referred to as a first difference in the number of switching operations ΔNx, and the difference in the number of switching operations ΔN when the closure time of the second switch SW2 and the third switch SW3 is set to a second time is referred to as a second difference in the number of switching operations ΔNy. In this case, the physical quantity related to the time constant is defined as "first difference in the number of switching operations ΔNx/second difference in the number of switching operations ΔNy" or "first difference in the number of switching operations ΔNx−second difference in the number of switching operations ΔNy". In the former definition, the physical quantity related to the time constant is a value close to "1" for a person, and is a value separated from "1" for water. In the latter definition, the physical quantity related to the time constant is a value close to "0" for a person, and is a value separated from "0" for water. For this reason, the discrimination between a person and water may be performed through detection of the physical quantity related to the time constant defined as above.

When there is no rain detection command, the sensor driving circuit 31 executes sampling control one time for each period (hereinafter, "normal sampling control P1").

When there is a rain detection command, the sensor driving circuit 31 executes additional sampling control P2 in addition to the normal sampling control P1 for each period (refer to FIG. 20). The normal sampling control P1 and the additional sampling control P2 are different in closure time of the second switch SW2 and the third switch SW3. The sensor driving circuit 31 obtains the physical quantity related to the time constant using the definition on the basis of differences in the number of switching operations ΔN obtained in the normal sampling control P1 and the additional sampling control P2, and determines whether there is an object approaching or being in contact with the sensor 32 from the physical quantity.

When the sensor driving circuit 31 detects "water" on the basis of the physical quantity related to the time constant (which is referred to as "water detection"), the sensor driving circuit 31 controls the sensor 32 of the door handle 3 in a low-resolution mode during the boarding and alighting of a person. When the sensor driving circuit 31 does not detect "water", the sensor driving circuit 31 controls the sensor 32 of the door handle 3 in a high-resolution mode during the boarding and alighting of a person.

Hereinafter, an effect of the vehicle door locking system 10 will be described.

The sensor driving circuit 31 has a function of determining the type of an object approaching or being in contact with the sensor 32. Furthermore, when the sensor driving circuit 31 detects "water", the sensor driving circuit 31 controls the sensor 32 in the low-resolution mode during the boarding and alighting of a person. When there is adherence of water, detection accuracy of the sensor device 30 is lowered due to change in the size of an area to which water adheres. However, in the above-described configuration, when water is detected, the sensor 32 is controlled in the low-resolution mode, and thus it is possible to suppress erroneous determination caused by adherence of water.

Other Embodiments

In each of the embodiments, the configuration of the sensor device 30 is not limited. The configuration of the sensor device 30 is not limited as long as the sensor device 30 can detect an object approaching or being in contact with the sensor device 30. In the first example, the sensor device 30 is configured of a capacitance sensor. However, the sensor device 30 may be configured of an optical sensor (for example, reflection type sensor), and a pressure sensitive sensor instead of this.

In each of the embodiments, the sensor device 30 may be configured of a plurality of sensors which are different in object detection means. For example, the sensor device 30 may be configured of the above-described capacitance sensor and a pressure sensitive sensor. In this case, the capacitance sensor and the pressure sensitive sensor are used separately depending on the situation. For example, when the sensor controller (the control circuit 13 or the sensor control circuit 70) determines that the capacitance sensor cannot be operated accurately due to deposited snow or the like, the pressure sensitive sensor is operated to detect contact with a hand.

In each of the embodiments, the configuration of the communication device 20 is not limited. In the first example, the communication device 20 is configured as a radio wave communication device. However, the communication device 20 may be configured as an infrared communication device instead of this. In a case where an infrared communication device is used as the communication device 20, an infrared driving circuit is used instead of the antenna driving circuit 22, and an infrared transmission detection circuit is used instead of the antenna driving detection circuit 60.

In each of the embodiments, the sensor device 30 may be controlled as being an obstacle detecting sensor. When the vehicle door 2 is open and the door handle 3 is about to come into contact with a wall, the sensor device 30 outputs a signal accompanying the approaching of the obstacle, and thus it is possible to determine whether the vehicle door 2 comes into contact with the obstacle using the signal. For example, when the vehicle door 2 is unlocked and open after the start of parking of the vehicle, the sensor controller (the control circuit 13 or the sensor control circuit 70) determines whether the vehicle door 2 comes into contact with an obstacle using the signal output from the sensor device 30, and outputs a notification sound when there is a possibility of the contact.

In each of the embodiments, when the door handle 3 has a configuration with which the door handle 3 can be accommodated in the vehicle door 2, the sensor device 30 may be controlled so as to function as a catch detecting sensor which detects whether a hand is caught during accommodation of the door handle 3. For example, the sensor controller (the control circuit 13 or the sensor control circuit 70) determines whether a hand is caught on the basis of a signal output from the sensor device 30 when there is an accommodation operation of the door handle 3, and outputs a notification sound when there is a possibility of a hand being caught. Alternately, the sensor controller causes a door handle driving device to stop the accommodation operation of the door handle 3, or causes the door handle 3 to protrude from an accommodation space instead of outputting a notification sound.

The vehicle door locking system 10 according to each of the embodiments may include another auxiliary device in addition to the sensor device 30. For example, the vehicle door locking system 10 may be provided with a cooling device, a heating device, an aroma diffuser, an acoustic device, a vibration device, or the like. These devices are controlled as follow. When the sensor controller (the control circuit 13 or the sensor control circuit 70) acquires the detection information of the portable device 23 in a vehicle parked state (hereinafter, "person approaching state"), the sensor controller adjusts the temperature of the door handle 3 to be comfort by operating the cooling device or the heating device. In addition, in the person approaching state, the sensor controller (the control circuit 13 or the sensor control circuit 70) operates the aroma diffuser to adjust the smell in the vicinity of the vehicle door 2. In addition, in the person approaching state, the sensor controller (the control circuit 13 or the sensor control circuit 70) outputs a melody specified by a user by operating the acoustic device. In addition, when the sensor 32 detects a hand, the sensor controller (the control circuit 13 or the sensor control circuit 70) causes the door handle 3 to vibrate by operating the vibration device.

(1) A vehicle door locking system according to an aspect of this disclosure includes a sensor device that is mounted in a door handle or a vehicle door of a vehicle, detects presence or absence of an object approaching or being in contact with the sensor device, and outputs a signal for locking or unlocking the vehicle door, and a sensor controller that controls the sensor device, in which the sensor controller changes a control state of the sensor device or changes a processing state of the signal output from the sensor device on the basis of new information which includes at least one of information output from the sensor device and information output from a device other than the sensor device. The new information indicates information obtained in real time or in sequence.

In this configuration, the sensor controller changes the control state or an output state of the sensor device on the basis of information. That is, the sensor device is controlled not only under the predetermined regulation control and the control state or the output state of the sensor device is changed on the basis of information. In this manner, the vehicle door locking system is capable of various operations.

(2) The vehicle door locking system may further include a portable device that stores unique information and can be carried by a person, and a communication device that communicates with the portable device. According to the configuration, the vehicle door locking system is capable of detecting the portable device.

(3) In the vehicle door locking system, the new information may be a driving time of an antenna of the communication device, and the sensor controller may set a period of sampling executed by the sensor device to be short when the driving time of the antenna is long.

A length of the driving time of the antenna indicates whether a person is present in the vicinity of the vehicle door. A long driving time of the antenna indicates that a person is present within a detection area of the communication device. In the above-described configuration, the sensor controller sets the period of the sampling executed by the sensor device to be short when the driving time of the antenna is long. In other words, before the driving time of the antenna becomes long, the period of the sampling executed by the sensor device is long. According to such control, it is possible to maintain a substantially high responsivity of the sensor device while reducing power consumption in the sensor device.

(4) In the vehicle door locking system, the new information may be a driving stoppage time of the antenna of the communication device, and the sensor controller may set the period of the sampling executed by the sensor device to be long when the driving stoppage time of the antenna becomes longer than a set stoppage time.

In this configuration, the sensor controller sets the period of the sampling executed by the sensor device to be long when the driving stoppage time of the antenna is longer than a set stoppage time. Therefore, according to the configuration, it is possible to suppress power consumption in the sensor device. In addition, the vehicle door locking system contributes to suppression of a decrease in the amount of electric power charged into the storage battery of the vehicle.

(5) In the vehicle door locking system, the new information may be detection information of the portable device, and the sensor controller may set the period of the sampling executed by the sensor device to be short when the portable device is detected.

In this configuration, when the portable device is detected, the period of the sampling executed by the sensor device is set to be short. In other words, when the portable device is not detected, the period of the sampling executed by the sensor device is long. According to such control, it is possible to maintain a substantially high responsivity of the sensor while reducing power consumption in the sensor device.

(6) In the vehicle door locking system, the new information may be position information of the portable device, and when the portable device is detected inside the vehicle, the sensor controller may set the period of the sampling executed by the sensor device to be longer than that in a case where the portable device is detected outside the vehicle.

The portable device being detected inside the vehicle indicates that there is a person in the vehicle. Therefore, there is a low possibility of the use of the sensor device in this case. In the above-described configuration, when the portable device is detected inside the vehicle, the sensor controller sets the period of the sampling executed by the sensor device to be longer than that in a case where the portable device is detected outside the vehicle. Accordingly, power consumption in the sensor device is reduced.

(7) In the vehicle door locking system, the new information may be an elapsed time from when parking of the vehicle is started, and the sensor controller may set the period of the sampling executed by the sensor device to be long according to a length of the elapsed time.

In this configuration, the sensor controller sets the period of the sampling executed by the sensor device to be long according to the length of the elapsed time. Accordingly, the sensor is operated with a high responsivity when there is a high possibility of the use of the sensor, and the sensor is operated with a low responsivity when there is a low possibility of the use of the sensor. According to such a configuration, a user is unlikely to feel that the responsivity of the sensor is low, and it is possible to reduce power consumption in the sensor device.

(8) In the vehicle door locking system, the new information may be an open and closed state of the vehicle door when the vehicle is in a parked state, and the sensor controller may set the period of the sampling executed by the sensor device to be short when the vehicle door is closed.

When the vehicle door is closed after being open with the vehicle being parked, the sensor in the door handle is used. In the above-described configuration, the sensor controller sets the period of the sampling executed by the sensor device to be short when the vehicle door is closed. For this reason, the locking operation performed when the vehicle door is closed can be detected quickly.

(9) In the vehicle door locking system, the new information may be a locked and unlocked state of the vehicle door when the vehicle is in the parked state, and the sensor controller may determine presence or absence of a locking operation on the basis of an output from the sensor device when all of the vehicle doors are in an unlocked state, and determine presence or absence of an unlocking operation on the basis of the output from the sensor device when not all of the vehicle doors are in the unlocked state.

In this configuration, the meaning of a signal output from the sensor device changes depending on the locked and unlocked state of the vehicle door. That is, as in the above-described configuration, when all of the vehicle doors are in the unlocked state, the sensor controller regards the sensor device as the locking sensor, and determines whether there is a locking operation on the basis of an output of the sensor device. When it is determined that not all of the vehicle doors are in the unlocked state, the sensor controller regards the sensor device as the unlocking sensor, and determines whether there is an unlocking operation on the basis of an output of the sensor device. According to such control, a portion of the sensor device for detecting the locking operation and a portion of the sensor device for detecting the unlocking operation can be the same portion, and thus the sensor device can be miniaturized.

(10) In the vehicle door locking system, the sensor device may be configured as a capacitance sensor which detects approaching of an object or contact with an object as a change in capacitance, the new information may be information related to noise in detection of the amount of change in capacitance, the sensor device may execute high-resolution control in which approaching of an object or contact with an object is detected with a high resolution which is higher than a reference resolution and execute low-resolution control in which approaching of an object or contact with an object is detected with a low resolution which is lower than the reference resolution, and the sensor controller may switch the control state of the sensor device between the high-resolution control, the low-resolution control, and a combination of the high-resolution control and the low-resolution control, on the basis of presence or absence of the new information.

In this configuration, the control state of the sensor device switches between the high-resolution control, the low-resolution control, and a combination of the high-resolution control and the low-resolution control, on the basis of information related to noise in detection of the amount of change in capacitance. Accordingly, a decrease in detection accuracy of the sensor device is suppressed.

(11) In the vehicle door locking system, the new information may be rainfall information output from an information terminal, water detection of the sensor device, or electromagnetic wave information, and the sensor controller may operate the sensor device using the low-resolution control when at least one of the rainfall information, the water detection of the sensor device, or the electromagnetic wave information is present.

Water adherence causes noise. In addition, electromagnetic waves cause noise in the sensor device. That is, new information as described above influences the detection accuracy of the sensor device. In this regard, in the above-described configuration, the sensor device is operated according to the low-resolution control when there is new information as described above. According to this configuration, it is possible to suppress an erroneous detection of the sensor device which occurs when there is rainfall or interfering electromagnetic waves.

(12) In the vehicle door locking system, the new information may be an unlocked state of the vehicle door, and the sensor controller may operate the sensor device such that the sensor device functions as an obstacle detecting sensor when the vehicle door is in the unlocked state. According to the configuration, it is possible to suppress a collision between the vehicle door and an obstacle.

The vehicle door locking system is capable of various operations.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A vehicle door locking system comprising:
   a sensor device that is mounted in a door handle or a vehicle door of a vehicle, detects presence or absence of an object approaching or being in contact with the sensor device, and outputs a signal for locking or unlocking the vehicle door; and
   a sensor controller that controls the sensor device,
   wherein the sensor controller changes a control state of the sensor device or changes a processing state of the signal output from the sensor device on the basis of new information which includes at least one of information output from the sensor device and information output from a device other than the sensor device;
   a portable device that stores unique information and can be carried by a person;
   a communication device that communicates with the portable device; and
   wherein the new information is position information of the portable device, and
   when the portable device is detected inside the vehicle, the sensor controller sets the period of the sampling executed by the sensor device to be longer than that in a case where the portable device is detected outside the vehicle.

2. The vehicle door locking system according to claim 1, wherein when the new information is a driving time of an antenna of the communication device, and the sensor controller sets a period of sampling executed by the sensor device to be short when the driving time of the antenna is long.

3. The vehicle door locking system according to claim 1, wherein when the new information is a driving stoppage time of the antenna of the communication device, and the sensor controller sets the period of the sampling executed by the sensor device to be long when the driving stoppage time of the antenna is longer than a set stoppage time.

4. The vehicle door locking system according to claim 1, wherein when the new information is detection information of the portable device, and the sensor controller sets the period of the sampling executed by the sensor device to be short when the portable device is detected.

5. The vehicle door locking system according to claim 1, wherein when the new information is an elapsed time from when parking of the vehicle is started, and the sensor controller sets the period of the sampling executed by the sensor device to be long according to a length of the elapsed time.

6. The vehicle door locking system according to claim 1, wherein when the new information is an open and closed state of the vehicle door when the vehicle is in a parked state, and the sensor controller sets the period of the sampling executed by the sensor device to be short when the vehicle door is closed.

7. The vehicle door locking system according to claim 1, wherein the new information is a locked and unlocked state of the vehicle door when the vehicle is in a parked state, and the sensor controller determines presence or absence of a locking operation on the basis of an output from the sensor device when all of the vehicle doors are in an unlocked state, and determines presence or absence of an unlocking operation on the basis of the output from the sensor device when not all of the vehicle doors are in the unlocked state.

8. The vehicle door locking system according to claim 1,
   wherein the sensor device is configured as a capacitance sensor which detects approaching of an object or contact with an object as a change in capacitance,
   the new information is information related to noise in detection of the amount of change in capacitance,
   the sensor device executes high-resolution control in which approaching of an object or contact with an object is detected with a high resolution which is higher than a reference resolution and executes low-resolution control in which approaching of an object or contact with an object is detected with a low resolution which is lower than the reference resolution, and
   the sensor controller switches the control state of the sensor device between the high-resolution control, the low-resolution control, and a combination of the high-resolution control and the low-resolution control, on the basis of presence or absence of the new information.

9. The vehicle door locking system according to claim 8,
   wherein the new information is rainfall information output from an information terminal, water detection of the sensor device, or electromagnetic wave information, and
   the sensor controller operates the sensor device using the low-resolution control when at least one of the rainfall information, the water detection of the sensor device, or the electromagnetic wave information is present.

10. The vehicle door locking system according to claim 1, wherein when the new information is an unlocked state of the vehicle door, and the sensor controller operates the sensor device such that the sensor device functions as an obstacle detecting sensor when the vehicle door is in the unlocked state.

* * * * *